(12) United States Patent
Okada et al.

(10) Patent No.: US 9,862,417 B2
(45) Date of Patent: Jan. 9, 2018

(54) TURNING ANGLE CORRECTION METHOD, TURNING ANGLE CORRECTION DEVICE, IMAGE-CAPTURING DEVICE, AND TURNING ANGLE CORRECTION SYSTEM

(71) Applicant: KYOCERA Corporation, Kyoto-shi, Kyoto (JP)

(72) Inventors: Takahiro Okada, Yokohama (JP); Takatoshi Nakata, Yokohama (JP); Ryuuichi Sawada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/915,620

(22) PCT Filed: Aug. 28, 2014

(86) PCT No.: PCT/JP2014/004437
§ 371 (c)(1),
(2) Date: Feb. 29, 2016

(87) PCT Pub. No.: WO2015/029443
PCT Pub. Date: Mar. 5, 2015

(65) Prior Publication Data
US 2016/0251030 A1   Sep. 1, 2016

(30) Foreign Application Priority Data

Aug. 28, 2013 (JP) .................................. 2013-177189
Sep. 26, 2013 (JP) .................................. 2013-200569

(51) Int. Cl.
*G06T 7/00* (2017.01)
*G06T 7/60* (2017.01)
(Continued)

(52) U.S. Cl.
CPC ....... *B62D 15/0295* (2013.01); *B62D 15/021* (2013.01); *G06T 1/0007* (2013.01);
(Continued)

(58) Field of Classification Search
None
See application file for complete search history.

(56) References Cited

U.S. PATENT DOCUMENTS

2004/0257244 A1* 12/2004 Kubota .............. B62D 15/0285
340/932.2
2008/0186383 A1* 8/2008 Dorrance ........... G01B 11/2755
348/148
(Continued)

FOREIGN PATENT DOCUMENTS

JP   60-15270 A    1/1985
JP   2004-201223 A   7/2004
(Continued)

OTHER PUBLICATIONS

Kazuo et al. "Vehicle Peripheral Monitoring Apparatus and Steering Angle Detecting Method", Jul. 15, 2004, publication No. 2004-201223.*
(Continued)

*Primary Examiner* — Kee M Tung
*Assistant Examiner* — Yanna Wu
(74) *Attorney, Agent, or Firm* — Procopio Cory Hargreaves and Savitch LLP

(57) ABSTRACT

A steering angle is corrected with reduced complicatedness in handling. Provided is a steering angle correction method, including: acquiring a measurement image of a steered wheel (14) in correspondence with a steering angle of a mobile object (10) at which the measurement image is captured; calculating a degree of coincidence between the steered wheel (14) on the measurement image and the steered wheel (14) on a reference image of the steered wheel (14) captured at a reference steering angle; and calculating a correction value used to correct the steering angle, based on the degree of coincidence.

15 Claims, 16 Drawing Sheets

(51) Int. Cl.
  *B62D 15/02* (2006.01)
  *G06T 1/00* (2006.01)
  *G06T 11/00* (2006.01)
  *G06T 7/73* (2017.01)
(52) U.S. Cl.
  CPC .................. *G06T 7/60* (2013.01); *G06T 7/74* (2017.01); *G06T 7/97* (2017.01); *G06T 11/00* (2013.01); *G06T 2207/30241* (2013.01)

(56) References Cited

U.S. PATENT DOCUMENTS

2011/0187862 A1* 8/2011 Ishikawa ................ B60K 28/00
  348/148
2012/0213452 A1* 8/2012 Matsuyama .......... G06T 3/4053
  382/294
2013/0151066 A1* 6/2013 Koukes ............... B60T 8/17551
  701/34.4

FOREIGN PATENT DOCUMENTS

| JP | 2005-1667 A | 1/2005 |
| JP | 2006-208199 A | 8/2006 |
| JP | 4323402 B2 | 9/2009 |
| JP | 2012-224248 A | 11/2013 |
| WO | 2012/032133 A1 | 3/2012 |

OTHER PUBLICATIONS

International Search Report and Written Opinion of the International Searching Authority issued by the Japanese Patent Office for International Application No. PCT/JP2014/004437.

Extended European Search Report dated Mar. 2, 2017, issued by the European Patent Office in counterpart European Patent Application No. 14 83 9821.7.

* cited by examiner $\theta_R = 0°$ $\theta_R = 10°$ $\theta_R = 20°$ $\theta_R = 30°$ $\theta_R = -30°$ $\theta_R = 0°$ $\theta_R = 10°$ $\theta_R = 20°$ $\theta_R = 30°$ $\theta_R = 0°$ $\theta_R = 10°$ $\theta_R = 20°$ $\theta_R = 30°$ $\theta_R = -30°$

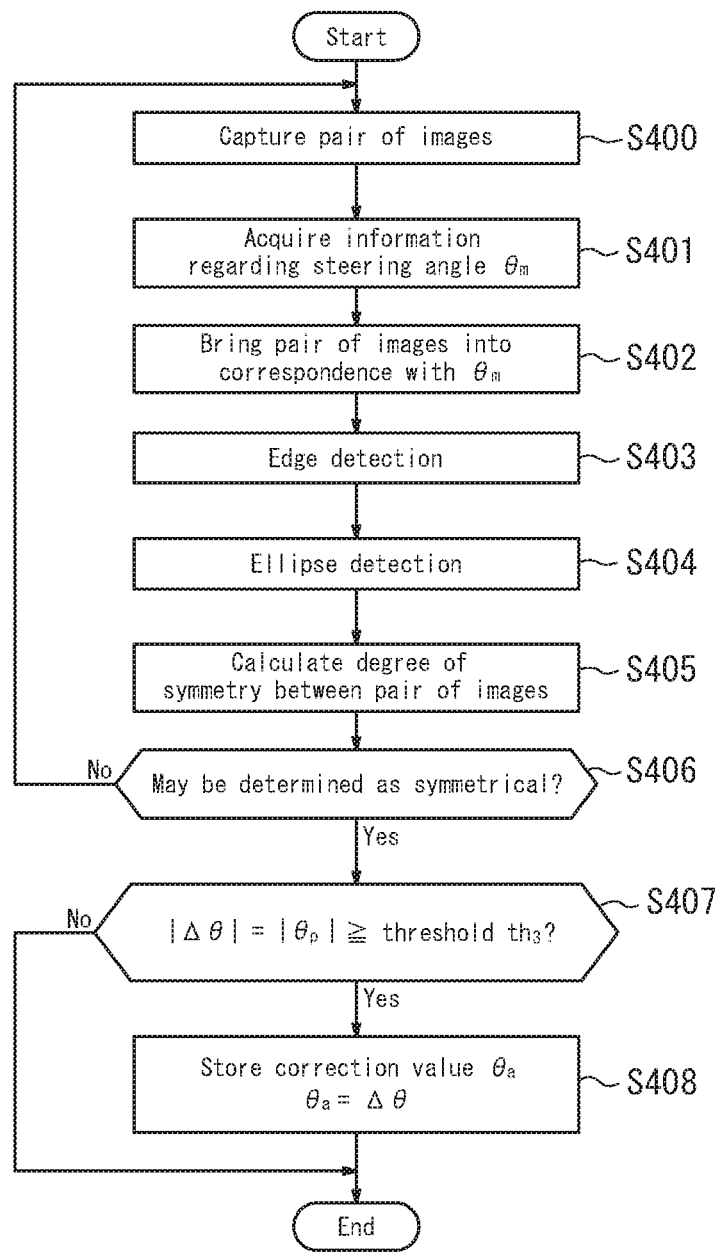

TURNING ANGLE CORRECTION METHOD, TURNING ANGLE CORRECTION DEVICE, IMAGE-CAPTURING DEVICE, AND TURNING ANGLE CORRECTION SYSTEM

CROSS-REFERENCE TO RELATED APPLICATION

This application claims priority to and the benefit of Japanese Patent Application No. 2013-177189 filed on Aug. 28, 2013 and Japanese Patent Application No. 2013-200569 filed on Sep. 26, 2013, the entire contents of which are incorporated herein by reference.

TECHNICAL FIELD

The present disclosure relates to a turning angle (steering angle) correction method, a steering angle correction device, an imaging device, and a steering angle correction system all of which contribute to correction of a steering angle of a mobile object.

BACKGROUND

There is conventionally known a technique of displaying an image of surroundings of a mobile object, such as a vehicle, that is captured by an onboard camera mounted on the mobile object, together with an image serving as a drive assisting indicator superimposed thereon. To superimpose such an indicator on the image of surroundings, a steering angle detected by a steering angle sensor or the like is used. The detected steering angle sometimes differs from the actual steering angle due to long use, steering replacement, and the like, and therefore, a steering angle neutral point is corrected (Patent Literature 1, for example).

CITATION LIST

Patent Literature

PTL 1: Japanese Patent No. 4323402

SUMMARY

Technical Problem

However, to correct the steering angle, the conventional technique requires precise handling of the steering to the maximum steering angle or the minimum steering angle. In this way, correction of the steering angle neutral point requires the special process, which complicates handling.

The present disclosure has been conceived in view of the above circumstance, and the present disclosure is to provide a steering angle correction method, a steering angle correction device, an imaging device, and a steering angle correction system by all which the steering angle is corrected with reduced complicatedness in handling.

Solution to Problem

To solve the above problem, one of aspects of the present disclosure resides in a steering angle correction method, including: acquiring a measurement image of a steered wheel in correspondence with a steering angle of a mobile object at which the measurement image is captured; calculating a degree of coincidence between the steered wheel on the measurement image and the steered wheel on a reference image of the steered wheel captured at a reference steering angle; and calculating a correction value used to correct the steering angle, based on the degree of coincidence.

In a preferred embodiment of the steering angle correction method according to the present disclosure, the measurement image is acquired in plurality, the plurality of measurement images being captured at different steering angles, and in the calculating the correction value, the correction value is calculated based on distribution of the degrees of coincidence with respect to the steering angles.

In yet another preferred embodiment of the steering angle correction method according to the present disclosure, the steering angle correction method further includes: extracting the steered wheel at least on the measurement image by ellipse detection, wherein in the calculating the degree of coincidence, the degree of coincidence is calculated by using parameters of ellipses detected.

In yet another preferred embodiment of the steering angle correction method according to the present disclosure, in the calculating the degree of coincidence, the degree of coincidence is calculated by assigning greater weight to at least one of the parameters indicating at least one of a short side and an inclination than to the remaining parameters of each ellipse.

In yet another preferred embodiment of the steering angle correction method according to the present disclosure, in the calculating the degree of coincidence, a degree of correlation is calculated as the degree of coincidence, the degree of correlation being obtained by image matching based on the measurement image and the reference image.

Another aspect of the present disclosure resides in a steering angle correction method, including: acquiring a pair of simultaneously captured images of a left and a right steered wheel in correspondence with a steering angle of a mobile object at which the pair of images is captured; calculating a degree of symmetry between the left and the right steered wheel on the pair of images; and calculating a correction value used to correct the steering angle, based on the degree of symmetry.

In a preferred embodiment of the steering angle correction method according to the present disclosure, the pair of images is acquired in plurality, the plurality of pairs of images being captured at different steering angles, and in the calculating the correction value, the correction value is calculated based on distribution of the degrees of symmetry with respect to the steering angles.

In yet another preferred embodiment of the steering angle correction method according to the present disclosure, the steering angle correction method further includes: extracting the left and the right steered wheel on the pair of images by ellipse detection, wherein in the calculating the degree of symmetry, the degree of symmetry is calculated by using parameters of ellipses detected.

In yet another preferred embodiment of the steering angle correction method according to the present disclosure, in the calculating the degree of symmetry, the degree of symmetry is calculated by assigning greater weight to at least one of the parameters indicating at least one of a short side and an inclination than to the remaining parameters of each ellipse.

In yet another preferred embodiment of the steering angle correction method according to the present disclosure, in the calculating the degree of symmetry, a degree of correlation is used to calculate the degree of symmetry, the degree of correlation being obtained by image matching based on the pair of images.

Yet another aspect of the present disclosure resides in a steering angle correction device, including: an acquisition unit configured to acquire a measurement image of a steered wheel in correspondence with a steering angle of a mobile object at which the measurement image is captured; and an arithmetic unit configured to calculate a correction value used to correct the steering angle, based on a degree of coincidence between the steered wheel on the measurement image and the steered wheel on a reference image of the steered wheel captured at a reference steering angle.

Yet another aspect of the present disclosure resides in an imaging device, including: a steering angle correction device including an acquisition unit configured to acquire a measurement image of a steered wheel in correspondence with a steering angle of a mobile object at which the measurement image is captured and an arithmetic unit configured to calculate a correction value used to correct the steering angle, based on a degree of coincidence between the steered wheel on the measurement image and the steered wheel on a reference image of the steered wheel captured at a reference steering angle; a first imaging unit configured to generate the measurement image; a second imaging unit configured to generate an image of surroundings of the mobile object; and an image superimposing unit configured to superimpose an indicator on the image of surroundings, based on the correction value.

Yet another aspect of the present disclosure resides in a steering angle correction system, including: a first imaging unit configured to generate a measurement image of a steered wheel; an acquisition unit configured to acquire the measurement image in correspondence with a steering angle of a mobile object at which the measurement image is captured; an arithmetic unit configured to calculate a correction value used to correct the steering angle, based on a degree of coincidence between the steered wheel on the measurement image and the steered wheel on a reference image of the steered wheel captured at a reference steering angle; a second imaging unit configured to generate an image of surroundings of the mobile object; an image superimposing unit configured to superimpose an indicator on the image of surroundings, based on the correction value; and a display configured to display the image of surroundings having the indicator superimposed thereon.

Yet another aspect of the present disclosure resides in a steering angle correction device, including: an acquisition unit configured to acquire a pair of simultaneously captured images of a left and a right steered wheel in correspondence with a steering angle of a mobile object at which the pair of images is captured; and an arithmetic unit configured to calculate a correction value used to correct the steering angle, based on a degree of symmetry between the left and the right steered wheel on the pair of images.

Yet another aspect of the present disclosure resides in an imaging device, including: a steering angle correction device including an acquisition unit configured to acquire a pair of simultaneously captured images of a left and a right steered wheel in correspondence with a steering angle of a mobile object at which the pair of images is captured and an arithmetic unit configured to calculate a correction value used to correct the steering angle, based on a degree of symmetry between the left and the right steered wheel on the pair of images; a first imaging unit configured to generate the pair of images; a second imaging unit configured to generate an image of surroundings of the mobile object; and an image superimposing unit configured to superimpose an indicator on the image of surroundings, based on the correction value.

Yet another aspect of the present disclosure resides in a steering angle correction system, including: a first imaging unit configured to generate a pair of simultaneously captured images of a left and a right steered wheel; an acquisition unit configured to acquire the pair of images in correspondence with a steering angle of a mobile object at which the pair of images is captured; an arithmetic unit configured to calculate a correction value used to correct the steering angle, based on a degree of symmetry between the left and the right steered wheel on the pair of images; a second imaging unit configured to generate an image of surroundings of the mobile object; an image superimposing unit configured to superimpose an indicator on the image of surroundings, based on the correction value; and a display configured to display the image of surroundings having the indicator superimposed thereon.

Advantageous Effect

According to the steering angle correction method, the steering angle correction device, the imaging device, and the steering angle correction system of the present disclosure, the steering angle is corrected with reduced complicatedness in handling.

BRIEF DESCRIPTION OF THE DRAWINGS

In the accompanying drawings:

FIG. 16 is a flowchart illustrating operation of a steering angle correction system according to a modification of the third and the fourth embodiment of the present disclosure.

DETAILED DESCRIPTION

Hereinafter, embodiments of the present disclosure will be described with reference to the drawings.

First Embodiment

Figure 1:
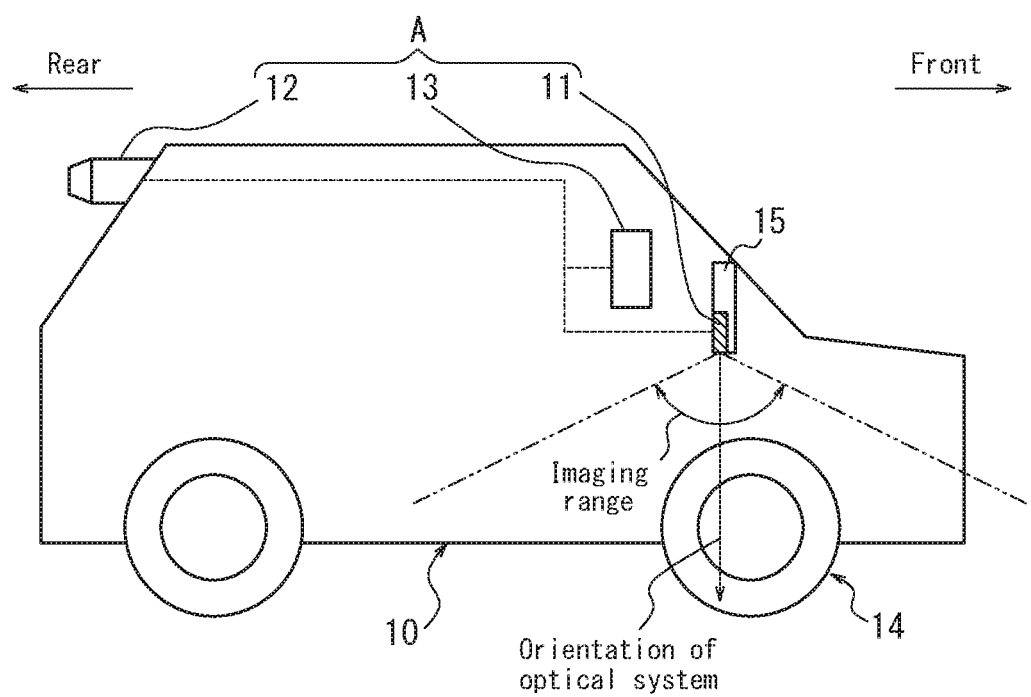
FIG. 1 is a schematic view illustrating arrangement of components of a steering angle correction system according to the first embodiment of the present disclosure.

To start with, a description is given of a steering angle correction system according to the first embodiment of the present disclosure. FIG. 1 is a schematic view illustrating arrangement of components of a steering angle correction system A in a mobile object 10 according to the first embodiment. The mobile object 10 is, for example, a vehicle.

As illustrated in FIG. 1, the steering angle correction system A includes an imaging device, which includes side cameras 11 and a rear camera 12, and a display 13. The side cameras 11 are disposed symmetrically on both left and right sides of the mobile object 10. The description below describes one of the side cameras 11 that is disposed on the right side of the mobile object 10 unless otherwise specified. The side camera 11 is disposed on, for example, a door mirror 15 in a manner such that the side camera 11 may capture an image of surroundings of the mobile object 10 including a steered wheel 14 of the mobile object 10. The rear camera 12 is disposed in a manner such that the rear camera may capture an image of surroundings at the rear of the mobile object 10. The display 13 is disposed in a position that allows the display 13 to be visible from a driver's seat, and the display 13 is configured to display images outputted by the side camera 11 and the rear camera 12.

Figure 2:
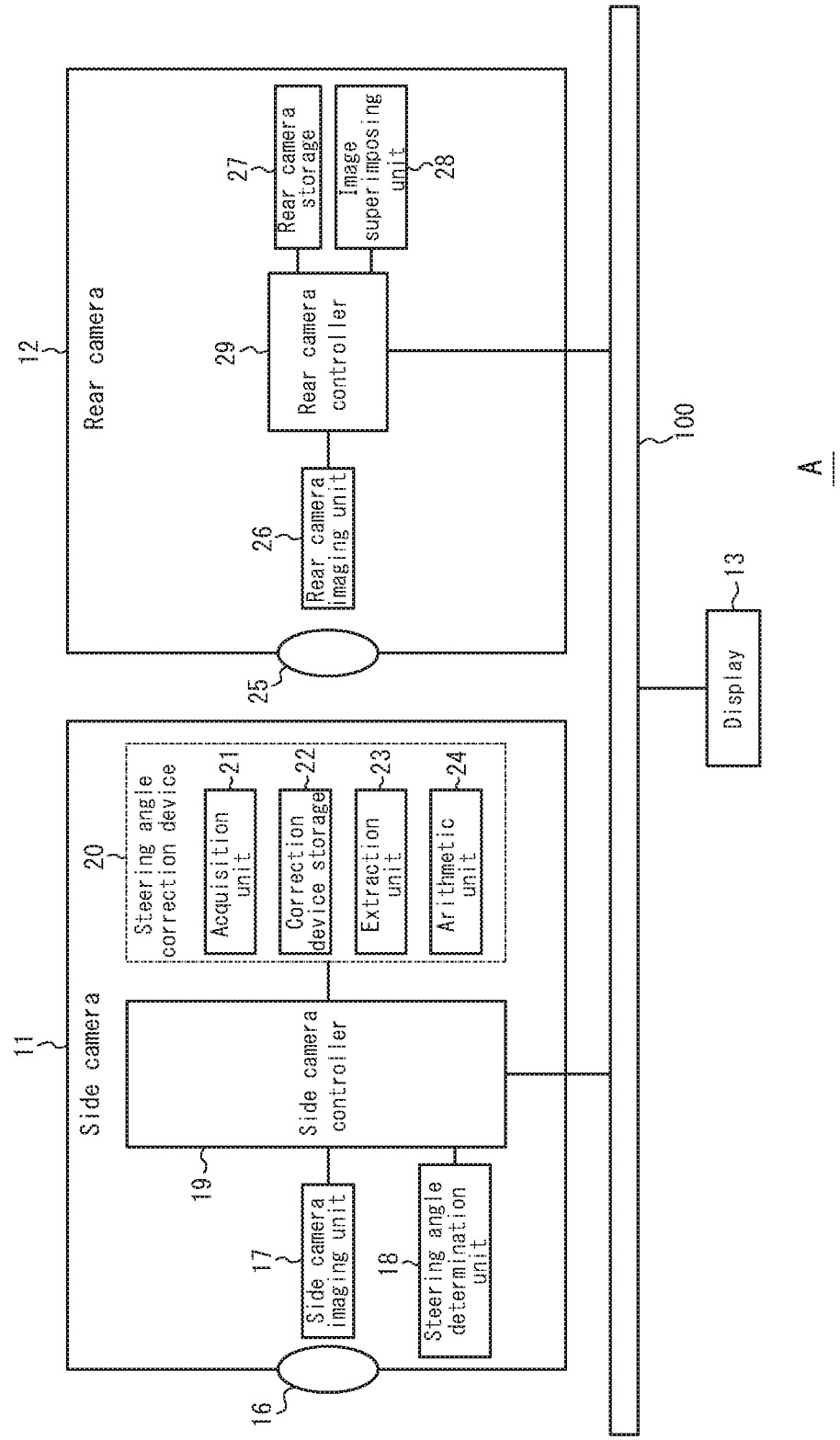
FIG. 2 is a function block view illustrating a schematic configuration of a steering angle correction system according to the first embodiment of the present disclosure.
Figure 3A:
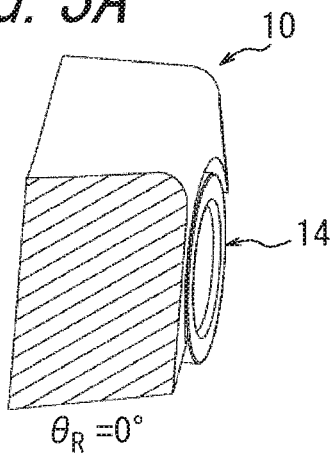
FIGS. 3A to 3E illustrate examples of images captured by a side camera of FIG. 1.
Figure 3B:
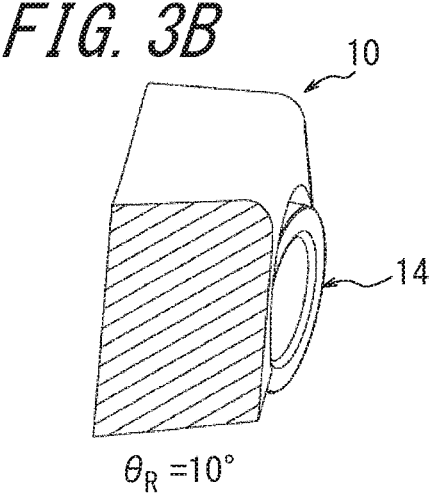
Figure 3C:
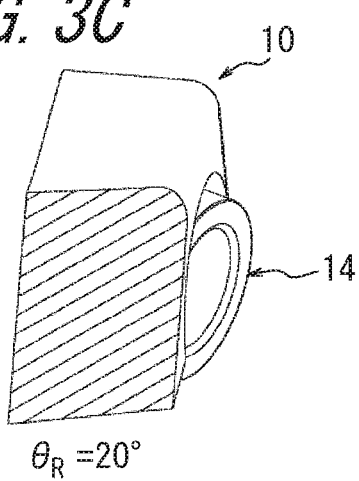
Figure 3D:
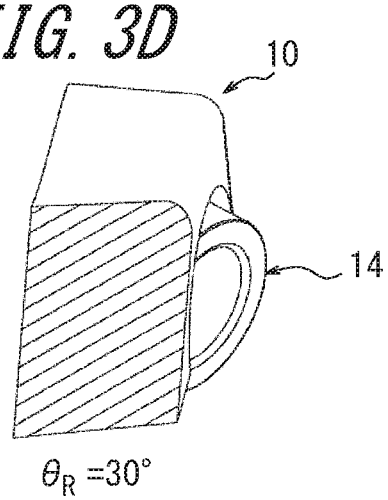
Figure 3E:
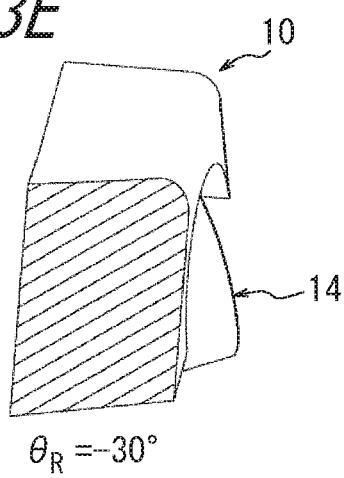
Figure 4A:
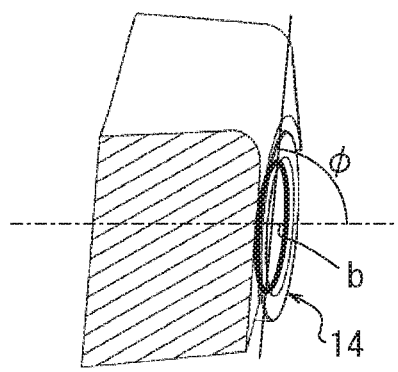
FIGS. 4A to 4D illustrate examples of the images captured by the side camera as illustrated in FIGS. 3A to 3D and subjected to ellipse detection.
Figure 4B:
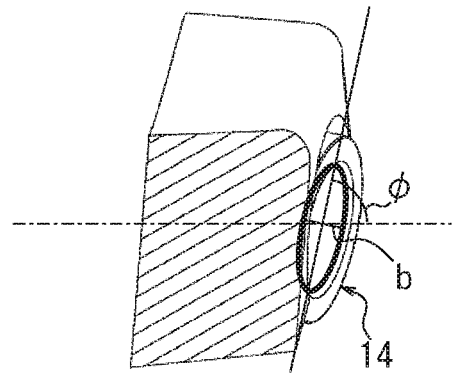
Figure 4C:
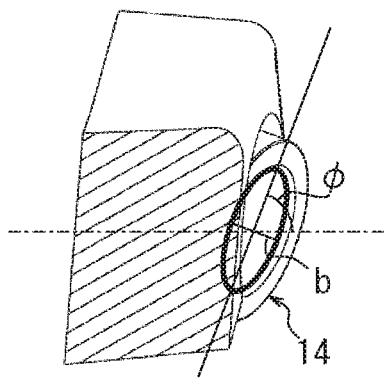
Figure 4D:
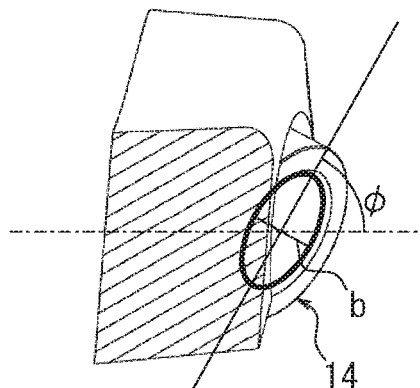

The following describes the configuration of the side camera 11. As illustrated in FIG. 2, the side camera 11 includes an optical system 16, a side camera imaging unit (the first imaging unit) 17, a steering angle determination unit 18, a side camera controller 19, and a steering angle correction device 20.

The optical system 16 includes a plurality of lenses. The optical system 16 forms an image of a subject.

The side camera imaging unit 17 is, for example, a CMOS imaging device and is configured to generate, as measurement images, images of a subject formed by an optical system. As mentioned earlier, the side camera 11 is disposed in a manner such that the side camera 11 may capture an image of surroundings of the mobile object 10 including the steered wheel 14. Measurement images may include images of the steered wheel 14 at varying steering angles $\theta_R$. A steering angle $\theta_R$ of the steered wheel herein refers to a turning angle of the steered wheel 14 within the steerable range of the steered wheel 14, with the steering angle neutral point defined as 0°. In the present embodiment, a steering angle $\theta_R$ of the steered wheel increases by rightward rotation of the steering.

Here, a description is given of the measurement images. The shape of the steered wheel 14 on each measurement image differs depending on the steering angle $\theta_R$ of the steered wheel. FIGS. 3A to 3E illustrate examples of measurement images at different steering angles $\theta_R$ of the steered wheel, and $\theta_R$=0° in FIG. 3A, $\theta_R$=10° in FIG. 3B, $\theta_R$=20° in FIG. 3C, $\theta_R$=30° in FIG. 3D, and $\theta_R$=−30° in FIG. 3E. A side surface of the steered wheel 14 on the measurement image at the steering angle neutral point ($\theta_R$=0°) of the steered wheel 14 has an elliptical shape (refer to 3A). As the steering angle $\theta_R$ of the steered wheel increases, a part of the side surface of the steered wheel 14 is concealed by the shadow of the mobile object 10, and accordingly, the steered wheel 14 has an elliptical shape that is partly missing (refer to FIGS. 3B to 3D). On the other hand, as the steering angle $\theta_R$ of the steered wheel decreases to a certain steering angle or less, the side surface of the steered wheel 14 does not appear on the image (refer to FIG. 3E).

Via the onboard network 100 such as CAN, the steering angle determination unit 18 (refer to FIG. 2) is configured to acquire a steering angle $\theta_m$ of the steered wheel detected by the steering angle sensor when each measurement image is captured. A steering angle $\theta_m$ refers to a turning angle of the steering within the steerable range of the steering, with a steering angle neutral point defined as 0°. In the present embodiment, a steering angle $\theta_m$ detected by the steering angle sensor increases by rightward rotation of the steering. Generally, steering angles $\theta_m$ detected by the steering angle sensor are in one-to-one correspondence with steering angles $\theta_R$ of the steered wheel.

The side camera controller 19 is configured to control operation of components of the side camera 11. For example, the side camera controller 19 controls the side camera imaging unit 17 to generate a measurement image periodically. The side camera controller 19 also transmits and receives information via the onboard network 100.

The steering angle correction device 20 is configured to calculate a correction value used to correct a steering angle $\theta_m$, which is detected by the steering angle sensor, to coincide with the actual steering angle $\theta_r$. Calculation of the correction value is described later in detail. The steering angle correction device 20 includes an acquisition unit 21, a correction device storage 22, an extraction unit 23, and an arithmetic unit 24.

The acquisition unit 21 is configured to acquire, from the side camera imaging unit 17 and the steering angle determination unit 18, a measurement image in correspondence with a steering angle $\theta_m$ detected by the steering angle sensor when the measurement image is captured.

The correction device storage 22 stores therein in advance an image (hereinafter, called the reference image) of the steered wheel 14 captured by the side camera imaging unit 17 in the state where the actual steering angle $\theta_r$ equals a reference steering angle $\theta_0$. Although the description below describes the reference steering angle $\theta_0$ as 0°, the reference steering angle $\theta_0$ may be set to any steering angle. The correction device storage 22 also stores therein the degree of coincidence between the steered wheel steered wheel on a measurement image and the steered wheel 14 on the reference image as calculated by the arithmetic unit 24, in correspondence with a steering angle $\theta_m$ detected by the steering angle sensor when the measurement image is captured. Furthermore, the correction device storage 22 stores therein a correction value $\theta_a$ calculated by the arithmetic unit 24. The degrees of coincidence and the correction value $\theta_a$ are described later in detail.

The extraction unit 23 is configured to extract the steered wheel 14 on a measurement image and the steered wheel 14 on the reference image. For example, the extraction unit 23 extracts the steered wheel 14 on each image by edge detection and ellipse detection (approximation). Edge detection uses, for example, the Canny filter to detect edge components on the image. Ellipse detection uses, for example, Hough transformation to calculate an elliptical shape approximated to the steered wheel 14 and parameters of the ellipse. The parameters of the ellipse refer to the central coordinate (x, y), the long side length a, and the short side length b of the ellipse and an inclination φ formed by the horizontal axis and the major axis of the ellipse on the image. Preferably, the extraction unit 23 extracts the steered wheel 14 on the image in a predetermined area on the image that may include the steered wheel 14. The predetermined area on the image that may include the steered wheel 14 may be determined in advance in consideration of, for example, differences in mounting angle of the side cameras 11 or may be determined automatically by the extraction unit 23 according to any method.

Here, a description is given of ellipses detected by ellipse detection. FIGS. 4A to 4D illustrate examples of ellipses (in thick lines in FIGS. 4A to 4D) detected with respect to measurement images at different steering angles $\theta_R$ of the steered wheel, and $\theta_R=0°$ in FIG. 4A, $\theta_R=10°$ in FIG. 4B, $\theta_R=20°$ in FIG. 4C, and $\theta_R=30°$ in FIG. 4D. Additionally, FIGS. 4A to 4D illustrate the examples where ellipse detection is applied to a wheel portion of the steered wheel 14. However, ellipse detection may also be applied to, for example, a tire portion of the steered wheel 14. Although in the examples where $\theta_R=10°$ or more the wheel portion of the steered wheel 14 has a partly missing elliptical shape (refer to FIGS. 3B to 3D), an ellipse conforming to the wheel portion of the steered wheel 14 is detected by ellipse detection (refer to FIGS. 4B to 4D). The shape of the detected ellipse differs depending on the steering angle $\theta_R$ of the steered wheel when the image is captured. In detail, as the steering angle $\theta_R$ of the steered wheel increases, the inclination φ formed by the horizontal axis and the major axis of the detected ellipse on the image decreases, and the short side length b of the same increases. On the other hand, even when the steering angle $\theta_R$ of the steered wheel increases, changes in the remaining parameters, namely, the central coordinate (x, y) and the long side length a, of the ellipse are relatively small (refer to FIGS. 4B to 4D).

The arithmetic unit 24 (refer to FIG. 2) is configured to calculate the degree of coincidence between the steered wheel 14 on a measurement image and the steered wheel 14 on the reference image. The degree of coincidence is an indicator of the degree of correspondence in shape of the steered wheel 14 on both the images. In the present embodiment, the arithmetic unit 24 performs image matching by using the measurement image from which the steered wheel 14 is extracted by the extraction unit 23 and the reference image and calculates the degree of correlation obtained from image matching as the degree of coincidence. The arithmetic unit 24 also stores, in the correction device storage 22, data of the calculated degree of coincidence (correlation) and the steering angle $\theta_m$ of the steered wheel that the steering angle sensor detects when the measurement image used for the calculation of the degree of coincidence is captured, in correspondence with each other.

Figure 5:
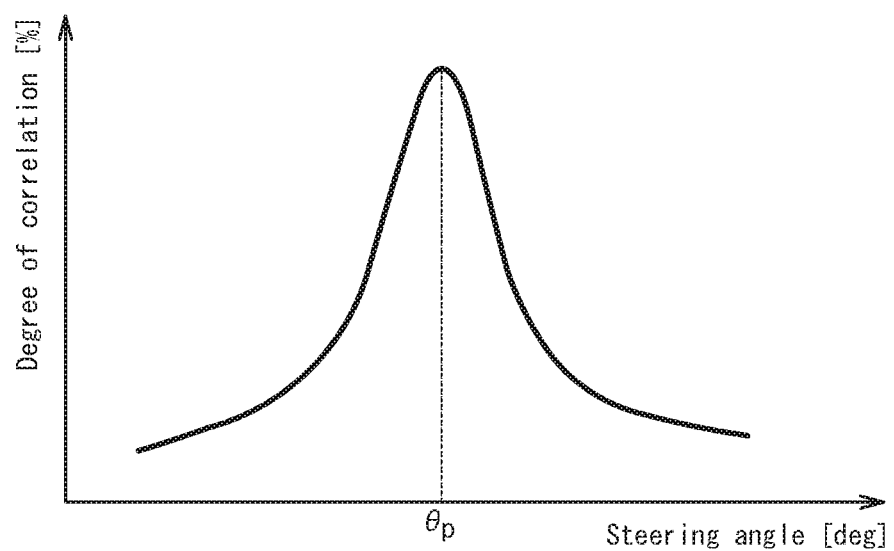
FIG. 5 illustrates a probability distribution of the degrees of coincidence according to the first embodiment or probability distribution of the degrees of symmetry according to the third embodiment of the present disclosure.

Furthermore, based on a plurality of pieces of data stored in the correction device storage unit 22, the arithmetic unit 24 calculates a probability distribution of the degrees of coincidence (correlation) with respect to the steering angles $\theta_m$ detected by the steering angle sensor (refer to FIG. 5). The probability distribution may adopt any probability distribution model. The arithmetic unit 24 also calculates a steering angle $\theta_p$ at the peak position of the calculated probability distribution. Preferably, the arithmetic unit 24 calculates the steering angle $\theta_p$ when sufficient data to calculate the probability distribution is stored. For example, the arithmetic unit 24 may calculate the steering angle $\theta_p$ when the number of pieces of stored data is greater than or equal to a predetermined threshold $th_1$ and when a variance $\sigma^2$ of the calculated probability distribution is less than a predetermined threshold $th_2$.

Herein, the steering angle $\theta_p$ at the peak position of the probability distribution calculated by the arithmetic unit 24 refers to an estimated value of the steering angle $\theta_m$ that the steering angle sensor detects when the actual steering angle $\theta_t$ equals the reference steering angle $\theta_0$ (=0°). In cases where there is an error (hereinafter, called the detection error) between the steering angle $\theta_m$ detected by the steering angle sensor and the actual steering angle $\theta_t$, the steering angle $\theta_m$ that the steering angle sensor detects when the actual steering angle $\theta_t$ is 0° equals the detection error of the steering angle sensor. The arithmetic unit 24 calculates the detection error Δθ of the steering angle sensor by the following formula.

$$\Delta\theta=\theta_p-\theta_0 \qquad (1)$$

When an absolute value of the calculated detection error Δθ is greater than or equal to a predetermined threshold $th_3$, that is to say, when a large error is present between the steering angle $\theta_m$ detected by the steering angle sensor and the actual steering angle $\theta_t$, the arithmetic unit 24 stores, in the correction device storage 22, the detection error Δθ as a correction value $\theta_a$. Alternatively, when the correction value $\theta_a$ is already stored in the correction device storage 22 and when an absolute value of the value obtained by subtracting the correction value $\theta_a$ from the detection error Δθ is greater than or equal to the predetermined threshold $th_3$, the arithmetic unit 24 updates the correction value $\theta_a$ with the detection error Δθ and stores the new correction value $\theta_a$ in the correction device storage 22. Then, the arithmetic unit 24 transmits the correction value $\theta_a$ to other components via the onboard network 100.

The following describes the configuration of the rear camera 12. As illustrated in FIG. 2, the rear camera 12 includes an optical system 25, a rear camera imaging unit (the second imaging unit) 26, a rear camera storage 27, an image superimposing unit 28, and a rear camera controller 29.

Similarly to the optical system 16 of the side camera 11, the optical system 25 includes a plurality of lenses and forms an image of a subject.

Similarly to the side camera imaging unit 17, the rear camera imaging unit 26 is configured to capture (generate) an image of surroundings formed by the optical system 25.

The rear camera storage 27 stores therein the correction value $\theta_a$ acquired from the side camera 11 via the onboard network 100.

The image superimposing unit 28 is configured to acquire, via the onboard network 100, a steering angle $\theta_m$ detected by the steering angle sensor. Furthermore, with a value obtained by correcting the steering angle $\theta_m$ detected by the steering angle sensor by using the correction value $\theta_a$, that is to say, with a value obtained by subtracting the correction value $\theta_a$ from the steering angle $\theta_m$, the image superimposing unit 28 superimposes a drive assisting indicator over a predetermined position on an image of surroundings captured by the rear camera imaging unit 26.

Figure 6:
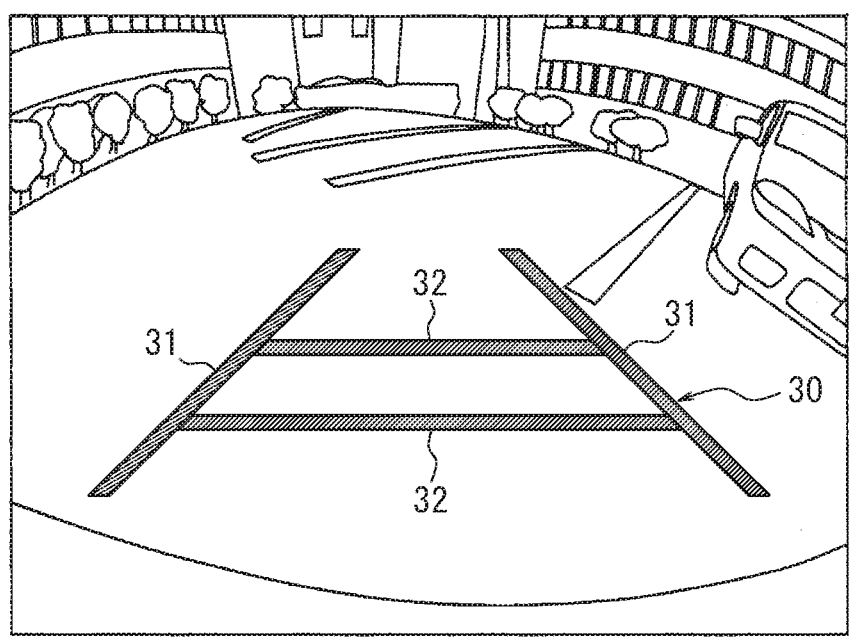
FIG. 6 illustrates an example of an image displayed on a display of FIG. 1.

As illustrated in FIG. 6, examples of the drive assisting indicator 30 include a vehicle width extension line 31 and a distance reference line 32. The vehicle width extension line 31 represents a track over which each end of the mobile object 10 passes during a backward movement, and the shape and display position of the vehicle width extension line 31 differs depending on the steering angle. The distance reference line 32 represents a predetermined distance, such as a distance of 1 m or 3 m, from the current mobile object 10. The indicator 30 allows a driver to perceive a direction in which the mobile object 10 is expected to move during the backward movement of the mobile object 10.

The rear camera controller 29 (refer to FIG. 2) is configured to control operation of components of the rear camera 12. The rear camera controller 29 also transmits and receives information via the onboard network 100.

Figure 7:
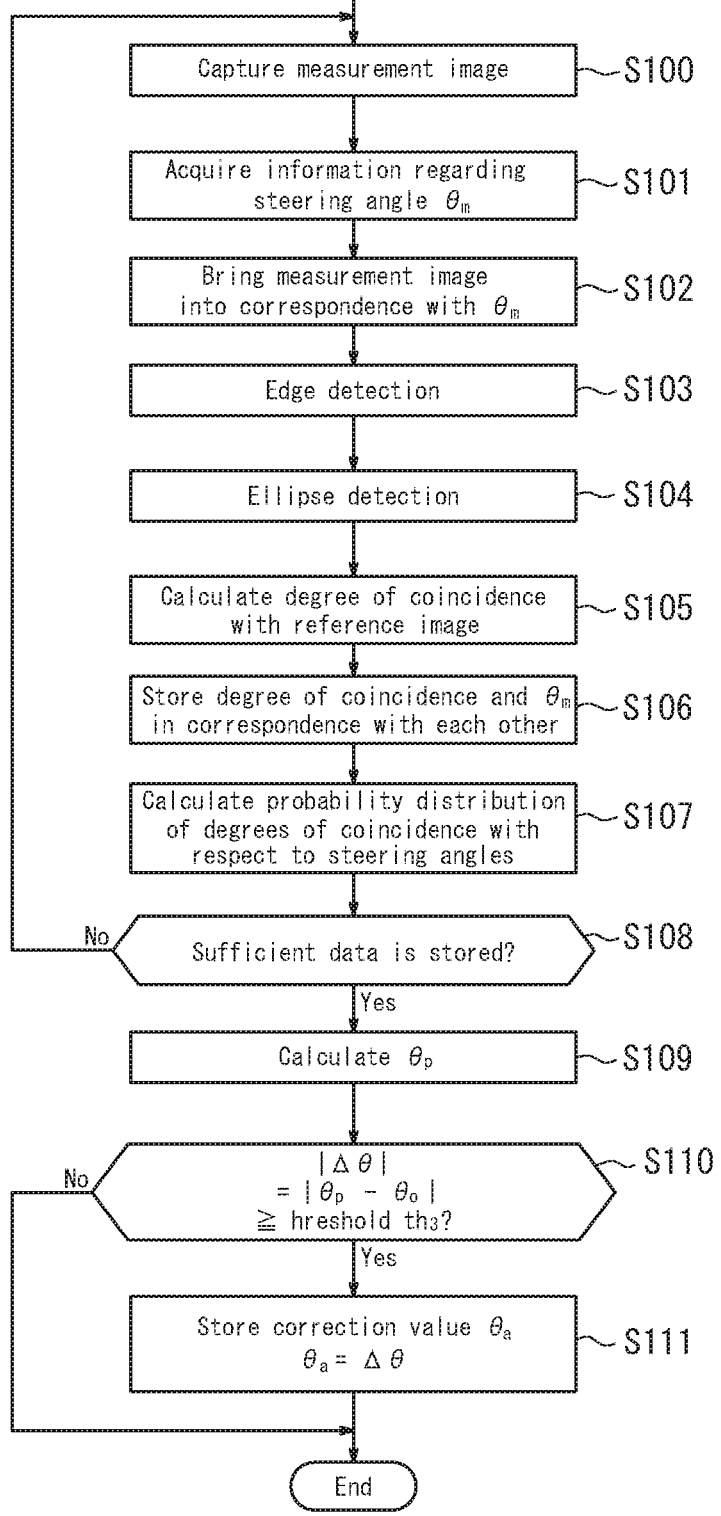
FIG. 7 is a flowchart illustrating operation of a steering angle correction system according to the first embodiment of the present disclosure.

Referring to a flowchart of FIG. 7, the following describes processing, performed by the steering angle correction system A, of calculating the correction value according to the first embodiment. The processing is performed when, for example, the mobile object 10 starts to drive.

Firstly, the side camera imaging unit 17 captures an image (a measurement image) of surroundings of the mobile object 10 including the steered wheel 14 (Step S100).

Simultaneously with Step S100 of capturing the measurement image, the steering angle determination unit 18 acquires, via the onboard network 100, the steering angle $\theta_m$ detected by the steering angle sensor (Step S101).

Subsequently, the acquisition unit 21 acquires the measurement image captured in Step S100 in correspondence with the steering angle $\theta_m$ acquired in Step S101 (Step S102).

Subsequently, the extraction unit 23 applies edge detection to the measurement image acquired in Step S102 and the reference image stored in the correction device storage 22 in advance (Step S103). Additionally, in cases where the side surface of the steered wheel 14 is not present on the measurement image, the extraction unit 23 uses a measurement image captured by another side camera 11 disposed on the opposite side of the mobile object 10.

Subsequently, the extraction unit 23 applies ellipse detection to the measurement image and the reference image to which edge detection is applied in Step S103 (Step S104).

Subsequently, the arithmetic unit 24 calculates the degree of coincidence between the steered wheel 14 on the measurement image and the steered wheel 14 on the reference image (Step S105). For example, the arithmetic unit 24 calculates the degree of correlation obtained from image matching as the degree of coincidence.

Subsequently, the arithmetic unit 24 stores, in the correction device storage 22, data of the degree of coincidence calculated in Step S105 and the steering angle $\theta_m$ that the steering angle sensor detects when the measurement image is captured, in correspondence with each other (Step S106).

Subsequently, based on a plurality of pieces of data stored in the correction device storage unit 22 in Step S106, the arithmetic unit 24 calculates the probability distribution of the degrees of coincidence (correlation) with respect to the steering angles $\theta_m$ detected by the steering angle sensor (Step S107).

Subsequently, the arithmetic unit 24 determines whether sufficient data to calculate the probability distribution is stored (Step S108). For example, the arithmetic unit 24 determines that sufficient data is stored when the number of pieces of stored data is greater than or equal to the predetermined threshold $th_1$ and when the variance $\sigma^2$ of the calculated probability distribution is less than the predetermined threshold $th_2$. When it is determined that sufficient data is stored (Yes in Step S108), processing moves to Step S109. On the other hand, when it is not determined that sufficient data is stored (No in Step S108), processing returns to Step S100 again for storing data.

When determining that sufficient data is stored (Yes in Step S108), the arithmetic unit 24 calculates the steering angle $\theta_p$ at the peak position of the probability distribution calculated in Step S107 (Step S109).

Subsequently, the arithmetic unit 24 determines whether the absolute value of the detection error $\Delta\theta$, which is calculated by subtracting the reference steering angle $\theta_0$ from the steering angle $\theta_p$ at the peak position of the probability distribution calculated in Step S109, is greater than or equal to the predetermined threshold $th_3$ (Step S110). When it is determined that the absolute value of the detection error $\Delta\theta$ is greater than or equal to the predetermined threshold $th_3$ (Yes in Step S110), processing moves to Step S111. On the other hand, when it is determined that the absolute value of the detection error $\Delta\theta$ is less than the predetermined threshold $th_3$ (No in Step S110), processing ends.

When determining that the absolute value of the detection error $\Delta\theta$ is greater than or equal to the predetermined threshold $th_3$ in Step S110 (Yes in Step S110), the arithmetic unit 24 stores, in the correction device storage 22, the detection error $\Delta\theta$ as the correction value $\theta_a$ (Step S111).

In this way, according to the steering angle correction system of the first embodiment, the correction value $\theta_a$ is calculated based on the degrees of coincidence between measurement images and the reference image. This allows automatic correction of a steering angle $\theta_m$ that the steering angle sensor detects during, for example, drive of the mobile object 10, thereby reducing complicatedness in handling by the operator.

Furthermore, according to the steering angle correction system of the first embodiment, the correction value $\theta_a$ is calculated based on the probability distribution of the degrees of coincidence with respect to the steering angles $\theta_m$ detected by the steering angle sensor. This allows estimation with high precision of the steering angle $\theta_m$ that the steering angle sensor detects when the actual steering angle $\theta_t$ equals the reference angle $\theta_0$ (=0°), thereby improving precision in calculation of the correction value $\theta_a$. This also reduces the influence of errors in measurement of the steering angles $\theta_m$ detected by the steering angle sensor, thereby improving precision in calculation of the correction value $\theta_a$.

Moreover, according to the steering angle correction system of the first embodiment, when sufficient data to calculate the probability distribution of the degrees of coincidence with respect to the steering angles $\theta_m$ detected by the steering angle sensor is stored, the steering angle $\theta_p$ at the peak position of the probability distribution is calculated, and the correction value $\theta_a$ is calculated by using the steering angle $\theta_p$. This prevents calculation and update of the correction value $\theta_a$ when the peak fails to be detected correctly, such as when the number of pieces of data is insufficient or when the variance is too large, thereby improving reliability of the correction value $\theta_a$.

Moreover, according to the steering angle correction system of the first embodiment, when the absolute value of the detection error $\Delta\theta$, which is calculated based on the steering angle $\theta_m$ detected by the steering angle sensor and the actual steering angle $\theta_t$, is greater than or equal to the threshold $th_3$, the detection error $\Delta\theta$ is stored as the correction value $\theta_a$. This prevents the correction value $\theta_a$ from calculated and updated because of a minor error caused by the influence of errors or the like in measurement of the steering angles $\theta_m$ detected by the steering angle sensor, thereby improving precision in calculation of the correction value $\theta_a$.

Moreover, according to the steering angle correction system of the first embodiment, edge detection is applied to each measurement image and the reference image. This reduces the influence caused by changes in the environment, such as whether and outside brightness, to the measurement image during drive of the mobile object 10, thereby improving precision in calculation of the degree of correlation obtained by image matching.

Second Embodiment

Next, a description is given of the second embodiment of the present disclosure. The steering angle correction system A according to the second embodiment is similar to that according to the first embodiment, except for processing performed by the steering angle correction device 20.

Similarly to the first embodiment, the steering angle correction device 20 according to the second embodiment includes the acquisition unit 21, the correction device storage 22, the extraction unit 23, and the arithmetic unit 24. The acquisition unit 21, the correction device storage 22, and the extraction unit 23 are similar to those in the first embodiment, and a description is omitted.

Similarly to the first embodiment, the arithmetic unit 24 is configured to calculate the degree of coincidence between the steered wheel 14 on a measurement image and the steered wheel 14 on the reference image. At this time, the arithmetic unit 24 according to the second embodiment calculates the degree of coincidence with use of parameters of the ellipses calculated by the extraction unit 23 by ellipse detection. In detail, the arithmetic unit 24 calculates a point t on a five-dimensional parameter space defined by the parameters of the ellipse of the steered wheel 14 detected from the measurement image. Similarly, the arithmetic unit 24 calculates a point a on the five-dimensional parameter space defined by the parameters of the ellipse of the steered wheel 14 detected from the reference image. A distance d between the two points on the parameter space is calculated by the formula $d=|t-a|$. Herein, the higher the degree of correlation between the elliptical shape detected from the measurement image and the elliptical shape detected from the reference image is, the smaller the value of the distance d becomes because the values of the parameters of each ellipse are similar. In contrast, the lower the degree of correlation between the two elliptical shapes is, the larger the value of the distance d becomes because the values of the parameters of each ellipse are different. Accordingly, the arithmetic 24 calculates the distance d on the parameter space calculated by using the parameters of the ellipses as the degree of coincidence. At this time, a smaller value of the distance d generally indicates a higher degree of coincidence.

Preferably, the arithmetic unit 24 calculates the degree of coincidence by using weighted values of parameters of the ellipses. As mentioned earlier, the shape of each ellipse detected differs depending on the steering angle $\theta_R$ (refer to FIGS. 4A to 4D). Herein, the amounts of change in the inclination φ and the short side length b of the ellipse are greater, and the amounts of change in the remaining parameters, namely, the central coordinate and the long side length, of the ellipse are small, in response to a change in the steering angle $\theta_R$ of the steered wheel. That is to say, the inclination φ and the short side length b of the ellipse are more sensitive to a change in the steering angle $\theta_R$ of the steered wheel. For example, the points t and a on the parameter space may be determined by assigning greater weight to at least one of the inclination φ and the short side length b among the parameters of the ellipses than to the remaining parameters, namely, the central coordinate (x, y) and the long side length a, and the distance d between the two points may be calculated as the degree of coincidence.

Figure 8:
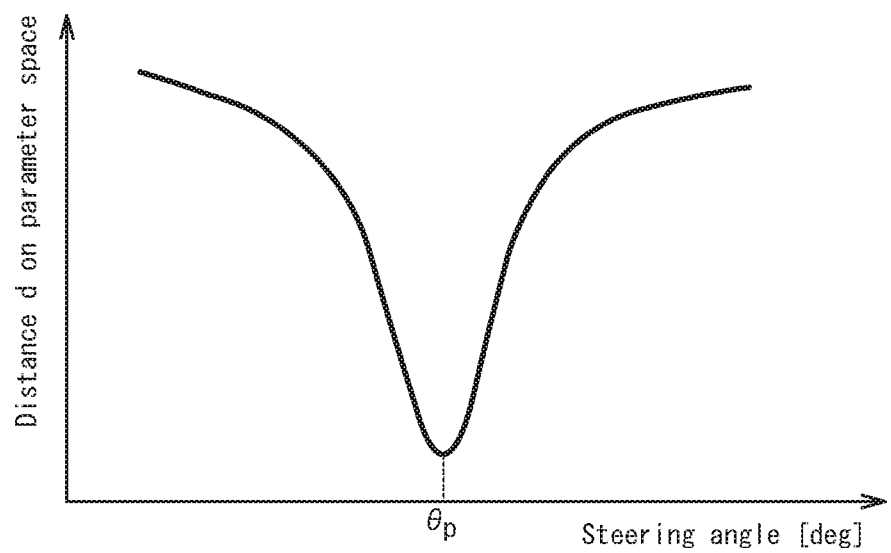
FIG. 8 illustrates a probability distribution of the degrees of coincidence according to the second embodiment or a probability distribution of the degrees of symmetry according to the fourth embodiment of the present disclosure.

Similarly to the first embodiment, the arithmetic unit 24 also calculates the probability distribution of the degrees of coincidence (distances d) and calculates the correction value $\theta_a$ based on the steering angle $\theta_p$ at the peak position of the calculated probability distribution. Since in the present embodiment the distance d on the parameter space calculated by using the parameters of the ellipses is used as the degree of coincidence, the peak of the probability distribution is directed downward (refer to FIG. 8).

In this way, according to the steering angle correction system of the second embodiment, the distance d on the parameter space, which is calculated based on the parameters of the ellipses detected from a measurement image and the reference image, is calculated as the degree of coincidence between the steered wheel 14 on the measurement image and the steered wheel 14 on the reference image. Accordingly, processing load is reduced compared with the first embodiment in which the degree of coincidence is calculated by image matching. Furthermore, by assigning greater weight to one or more parameters more sensitive to a change in the steering angle $\theta_R$ of the steered wheel among the plurality of parameters of each ellipse, precision in calculation of the degree of coincidence is improved, and precision in calculation of the correction value $\theta_a$ is improved.

Modification of First and Second Embodiments

Next, a description is given of a steering angle correction system according to a modification of the first and the second embodiment of the present disclosure. The steering angle correction system A according to the present modification is similar to that according to the first embodiment, except for that that the probability distribution of the degrees of coincidence is not calculated and that the correction value $\theta_a$ is calculated when a measurement image coincides with the reference image.

Similarly to the first embodiment, the steering angle correction device 20 includes the acquisition unit 21, the correction device storage 22, the extraction unit 23, and the arithmetic unit 24. The acquisition unit 21 and the extraction unit 23 are similar to those in the first embodiment, and a description is omitted.

The correction device storage 22 stores therein the reference image in advance. Furthermore, the correction device storage 22 stores therein the correction value $\theta_a$ calculated by the arithmetic unit 24.

The arithmetic unit 24 is configured to calculate the degree of coincidence between the steered wheel 14 on a measurement image and the steered wheel 14 on the reference image. In the present modification, either one of the degree of correlation obtained by image matching and the distance d between the two points on the parameter space of the ellipses may be adopted as the degree of coincidence. The description below describes an example where the degree of correlation, obtained by image matching using the measurement image and the reference image, is calculated.

Based on the calculated degree of coincidence (correlation), the arithmetic unit 24 determines whether the shape of the steered wheel 14 on the measurement image coincides with the shape of the steered wheel 14 on the reference image. It is determined that the shapes coincide with each other when, for example, the degree of correlation as the degree of coincidence is greater than or equal to a predetermined threshold $th_4$. When determining that the shapes of the steered wheel 14 coincide with each other, the arithmetic unit 24 calculates the detection error Δθ between the steering angle $θ_m$ detected by the steering angle sensor and the actual steering angle $θ_t$ by the following formula.

$$Δθ = θ_m - θ_0 \quad (2)$$

Herein, $θ_m$ represents the steering angle that the steering angle sensor detects when the measurement image used for the calculation of the degree of coincidence is captured, and $θ_0$ represents the reference steering angle. Furthermore, similarly to the first embodiment, when the absolute value of the calculated detection error Δθ is greater than or equal to the predetermined threshold $th_3$, the arithmetic unit 24 stores, in the correction device storage 22, the detection error Δθ as the correction value $θ_a$.

Figure 9:
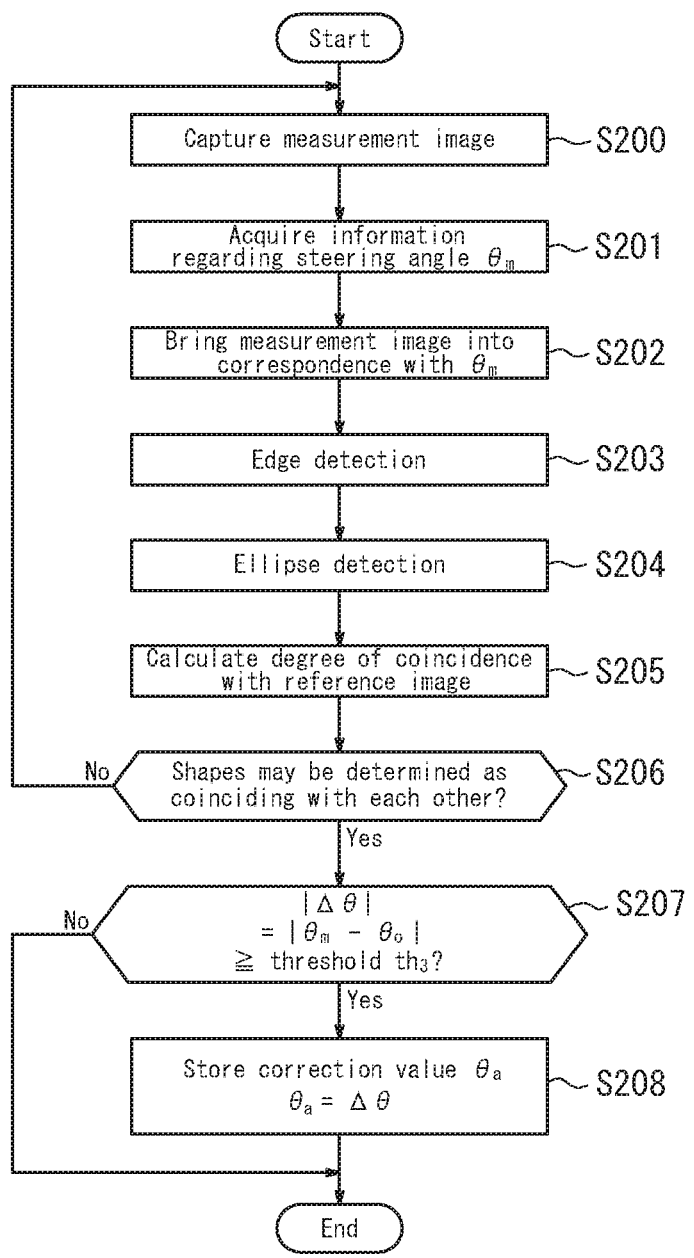
FIG. 9 is a flowchart illustrating operation of a steering angle correction system according to a modification of the first and the second embodiment of the present disclosure.

The following describes processing, performed by the steering angle correction system A, of calculating the correction value according to the present modification with reference to a flowchart of FIG. 9.

Firstly, the side camera imaging unit 17 captures an image (a measurement image) of surroundings of the mobile object 10 including the steered wheel 14 (Step S200).

Simultaneously with Step S200 of capturing the measurement image, the steering angle determination unit 18 acquires, via the onboard network 100, the steering angle $θ_m$ detected by the steering angle sensor (Step S201).

Subsequently, the acquisition unit 21 acquires the measurement image captured in Step S200 in correspondence with the steering angle $θ_m$ acquired in Step S201 (Step S202).

Subsequently, the extraction unit 23 applies edge detection to the measurement image acquired in Step S202 and the reference image stored in the correction device storage 22 in advance (Step S203). Additionally, in cases where the side surface of the steered wheel 14 is not present on the measurement image, the extraction unit 23 uses a measurement image captured by another side camera 11 disposed on the opposite side of the mobile object 10.

Subsequently, the extraction unit 23 applies ellipse detection to the measurement image and the reference image to which edge detection is applied in Step S203 (Step S204).

Subsequently, the arithmetic unit 24 calculates the degree of coincidence between the steered wheel 14 on the measurement image and the steered wheel 14 on the reference image (Step S205). For example, the arithmetic unit 24 calculates the degree of correlation obtained from image matching as the degree of coincidence.

Subsequently, the arithmetic unit 24 determines whether the shape of the steered wheel 14 on the measurement image coincides with the shape of the steered wheel 14 on the reference image (Step S206). The arithmetic unit 24 determines that the shapes coincide with each other when, for example, the degree of correlation as the degree of coincidence is greater than or equal to the predetermined threshold $th_4$. When it is determined that the shapes coincide with each other (Yes in Step S206), processing moves to Step S207. When it is not determined that the shapes coincide with each other (No in Step S206), processing returns to Step S200.

When determining that the shapes coincide with each other in Step S206 (Yes in Step S206), the arithmetic unit 24 determines whether the absolute value of the detection error Δθ, which is calculated by subtracting the reference steering angle $θ_0$ from the steering angle $θ_m$ acquired in Step S202, is greater than or equal to the predetermined threshold $th_3$ (Step S207). When it is determined that the absolute value of the detection error Δθ is greater than or equal to the predetermined threshold $th_3$ (Yes in Step S207), processing moves to Step S208. On the other hand, when it is determined that the detection error Δθ is less than the predetermined threshold $th_3$ (No in Step S207), processing ends.

When determining that the detection error Δθ is greater than or equal to the predetermined threshold $th_3$ in Step S207 (Yes in Step S207), the arithmetic unit 24 stores, in the correction device storage 22, the detection error Δθ as the correction value $θ_a$ (Step S208).

In this way, according to the steering angle correction system of the present modification, everytime a measurement image and the steering angle $θ_m$ detected by the steering angle sensor are acquired in correspondence with each other, it is determined whether the shapes of the steered wheel 14 on both the images coincide with each other based on the calculated degree of coincidence. Then, when it is determined that the shapes coincide with each other, the correction value $θ_a$ is calculated. Accordingly, unlike the first embodiment, there is no need for storing, in the correction device storage 22, data of the steering angles $θ_m$ detected by the steering angle sensor and the degrees of coincidence in one-to-one correspondence, and the volume of stored data is reduced.

Although the present disclosure has been described based on the drawings and the embodiments, it is to be noted that a person skilled in the art may easily make various changes and modifications according to the present disclosure. Therefore, such changes and modifications are to be understood as included within the scope of the present disclosure.

For example, components of the steering angle correction system may be separated and rearranged. In one example, the steering angle correction system may further include a navigation device that assists a driver, and the navigation device may include the arithmetic unit 24 of the steering angle correction device 20 and the image superimposing unit 28 of the rear camera 12.

Furthermore, a configuration that determines whether an ellipse detected by the extraction unit 23 correctly extracts the steered wheel 14 may also be included. For example, whether the steered wheel 14 is extracted may be determined by using information regarding colors on the measurement image prior to edge detection within the ellipse on the measurement image. By thus improving precision in extraction of the steered wheel 14 on a measurement image and improving precision in calculation of the degree of coincidence, precision in calculation of the correction value $θ_a$ is improved.

Moreover, although in the above embodiments the correction device storage 22 stores therein the reference image in advance, edge detection and ellipse detection may be applied to the reference image prior to storage. In this case, the extraction unit 23 does not need to apply edge detection and ellipse detection to the reference image, and processing load is reduced.

Moreover, although in the above embodiments the steering angle correction device 20 stores the calculated correction value $θ_a$ in the correction device storage 22, the correction value $θ_a$ may be transmitted to the steering angle sensor, and an output value of the steering angle sensor may be corrected. In this case, the image superimposing unit 28 does not need to correct a steering angle acquired via the onboard network 100, and processing load is reduced.

Moreover, although in the above embodiments the image superimposing unit 28 superposes the indicator 30 on an image captured by the rear camera 12, the indicator 30 may also be superimposed on an image captured by a front camera configured to capture an image of surroundings in front of the mobile object 10.

Moreover, although in the above embodiments the degree of correlation obtained by image matching or a distance between two points on the parameter space based on parameters of ellipses is used as the degree of coincidence, any indicator, which indicates the degree of correspondence between the shape of the steered wheel 14 on a measurement image and the shape of the steered wheel 14 on the reference image, may be adopted.

Moreover, although in the first embodiment the side camera controller 19 controls the side camera imaging unit 17 to generate a measurement image periodically, in addition to or in replacement of the periodical imaging, a measurement image may be generated when a predetermined condition is satisfied. For example, a measurement image may be generated when the steering angle $\theta_m$ detected by the steering angle sensor equals a predetermined steering angle. This allows use of data in a broader range of steering angles for calculating the probability distribution of the degrees of coincidence, and precision in calculation of the probability distribution of the degrees of coincidence is improved, and accordingly, precision in calculation of the correction value $\theta_a$ is improved.

Moreover, in the second embodiment, the correction device storage 22 may store therein in advance the parameters of the ellipse detected from the reference image. In this case, the correction device storage 22 does not need to store therein the reference image, and the volume of stored data is reduced.

Third Embodiment

Figure 10A:
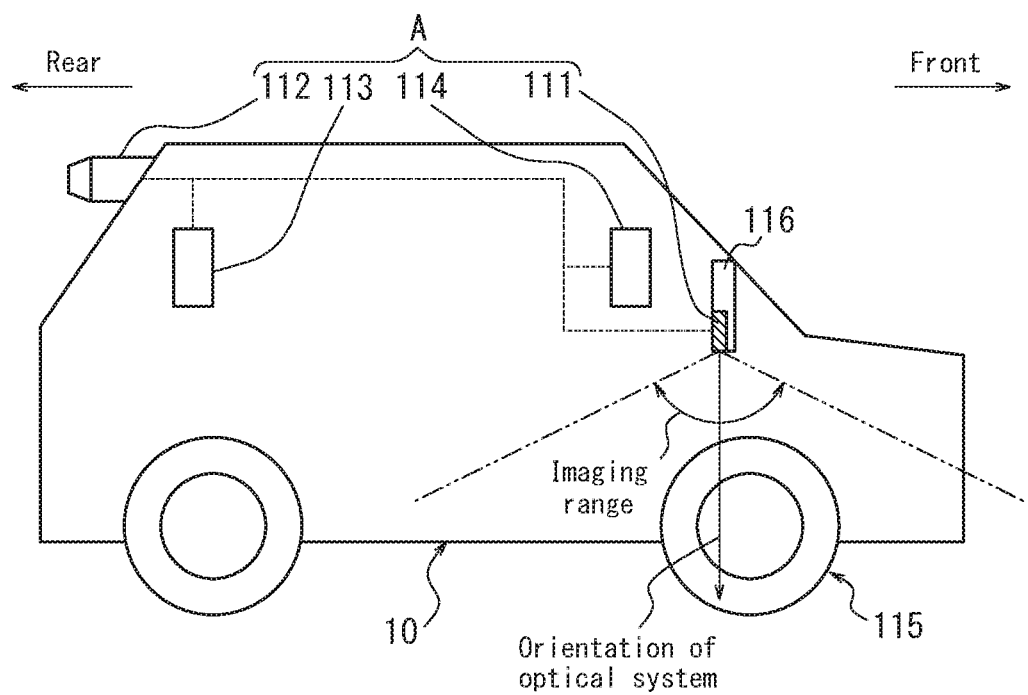
FIGS. 10A to 10C are schematic views illustrating arrangement of components of a steering angle correction system according to the third embodiment of the present disclosure.

Next, a description is given of a steering angle correction system according to the third embodiment of the present disclosure. FIGS. 10A to 10O are schematic views illustrating arrangement of components of a steering angle correction system B in a mobile object 10 according to the third embodiment of the present disclosure. The mobile object 10 is, for example, a vehicle.

Figure 10B:
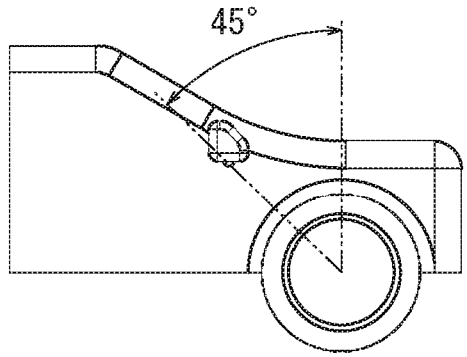
Figure 10C:
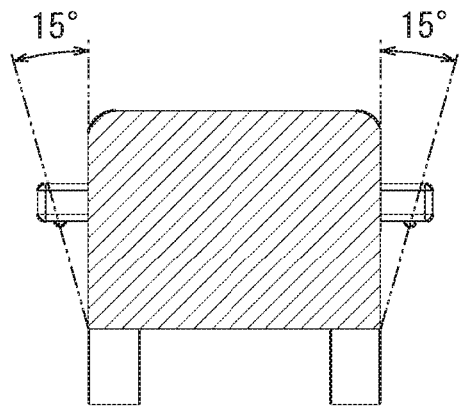

Two side cameras 111 of the steering angle correction system B are disposed on left and right sides of the mobile object 10 symmetrically (refer to FIG. 10O), for example, each in a position at 45° toward a rear direction of the mobile object 10 with respect to a vertically upward direction from the middle of a side surface of a steered wheel 115 as viewed from the side of the mobile object 10 (refer to FIG. 10B) and at 15° laterally outward from the mobile object 10 as viewed from the back (refer to FIG. 10C). The two side cameras 111 may also be disposed on a left and a right side mirror 116. The left and the right side camera 111 may each capture an image of surroundings of the mobile object 10 including the steered wheel 115 located on the corresponding side. A rear camera 112 of the steering angle correction system B is disposed in a manner such that the rear camera 112 may capture an image of surroundings at the rear of the mobile object 10. A steering angle correction device 113 of the steering angle correction system B may be disposed in any position in the mobile object 10. A display 114 of the steering angle correction system B is disposed in a position that allows the display 114 to be visible from the driver's seat, and the display 114 is configured to display images outputted by the side camera 111 and the rear camera 112.

Figure 11:
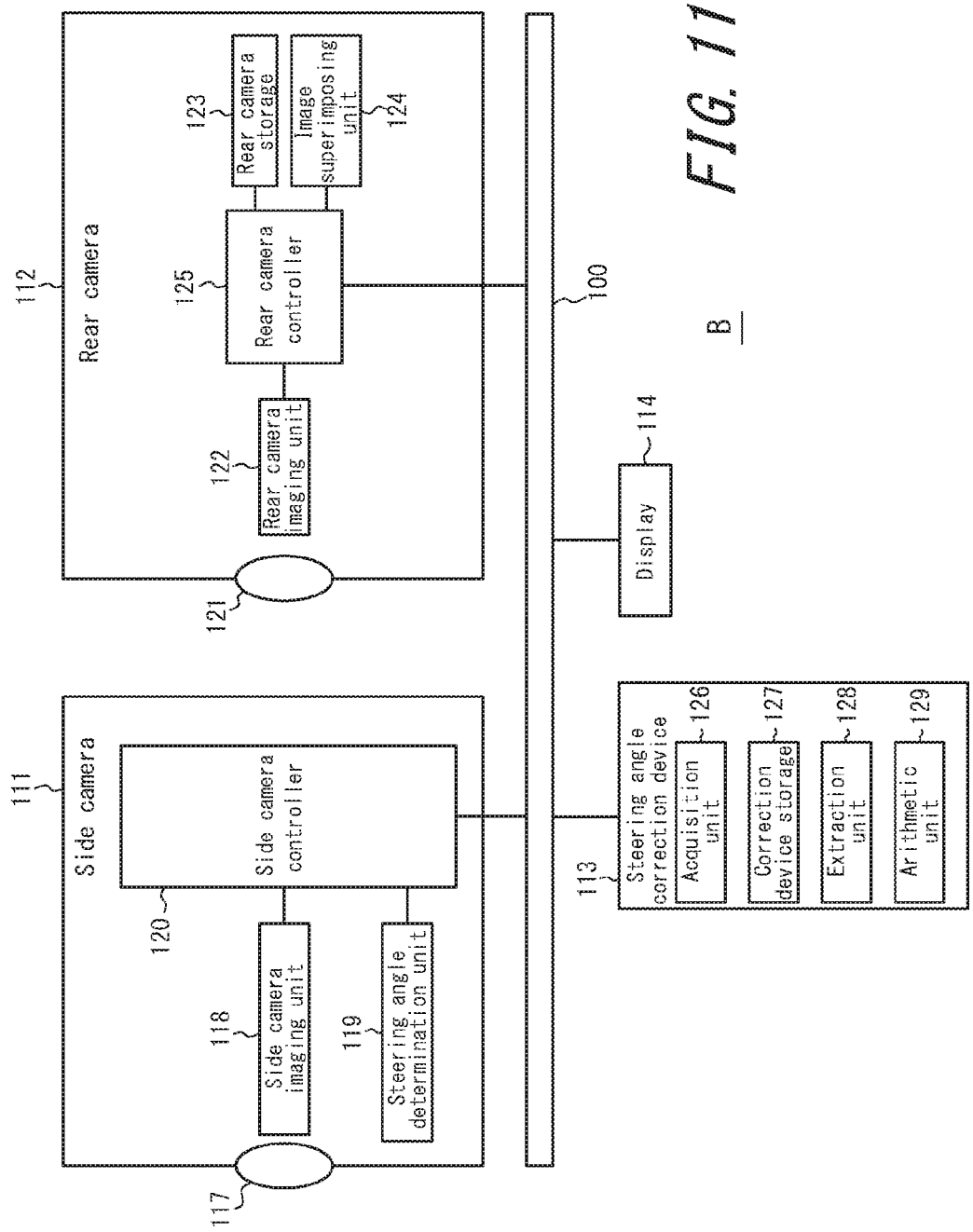
FIG. 11 is a function block view illustrating a schematic configuration of a steering angle correction system according to the third embodiment of the present disclosure.

The following describes the configuration and functions of the steering angle correction system B in detail with reference to FIG. 11. As illustrated in FIG. 11, the steering angle correction system B includes each side camera 111, the rear camera 112, the steering angle correction device 113, and the display 114.

The side camera 111 includes an optical system 117, a side camera imaging unit (the first imaging unit) 118, a steering angle determination unit 119, and a side camera controller 120.

The optical system 117 includes a plurality of lenses and forms an image of a subject.

The side camera imaging unit 118 is, for example, a CMOS imaging device and is configured to generate images of a subject formed by the optical system 117. As described above, the left and the right camera 111 is disposed in a manner such that each side camera 111 may capture an image of surroundings of the mobile object 10 including the steered wheel 115 located on the corresponding side, and thus generated images may include images of the steered wheel 115 at varying steering angles $\theta_R$. A steering angle $\theta_R$ of the steered wheel herein refers to a turning angle of the steered wheel 115 within the steerable range of the steered wheel 115, with the steering angle neutral point defined as 0°. In the present embodiment, a steering angle $\theta_R$ of the steered wheel increases by rightward rotation of the steering. The values of steering angles $\theta_R$ are positive when the steering is rotated rightward from the steering angle neutral point, and the values of steering angles $\theta_R$ are negative when the steering is rotated leftward from the steering angle neutral point.

The following describes images generated by the side camera 111. The shape of the steered wheel 14 on each image differs depending on the steering angle $\theta_R$ of the steered wheel. FIGS. 12A to 12E illustrate examples of images captured by the right side camera 111 at different steering angles $\theta_R$ of the steered wheel, and $\theta_R=0°$ in FIG. 12A, $\theta_R=10°$ in FIG. 12B, $\theta_R=20°$ in FIG. 12C, $\theta_R=30°$ in FIG. 12D, and $\theta_R=-30°$ in FIG. 12E. A side surface of the steered wheel 115 on the image at the steering angle neutral point ($\theta_R=0°$) of the steered wheel 115 has an elliptical shape (refer to 12A). As the steering angle $\theta_R$ of the steered wheel increases from 0°, a part of the side surface of the steered wheel 115 is concealed by the shadow of the mobile object 10, and accordingly, the steered wheel 115 has an elliptical shape that is partly missing (refer to FIGS. 12B to 12D). On the other hand, as the steering angle $\theta_R$ of the steered wheel decreases from 0° to a certain steering angle or less, the side surface of the steered wheel 115 does not appear on the image (refer to FIG. 12E).

Figure 12A:
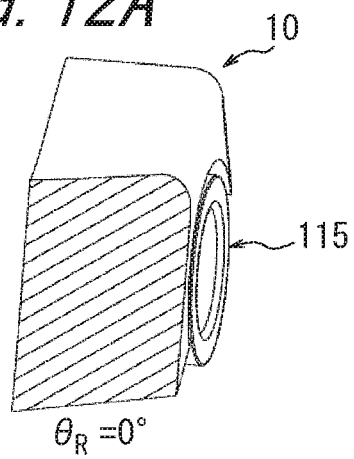
FIGS. 12A to 12E illustrate examples of images captured by a right side camera of FIGS. 10A to 10C.
Figure 12B:
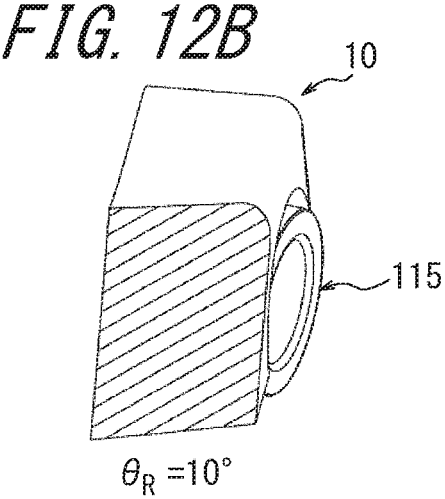
Figure 12C:
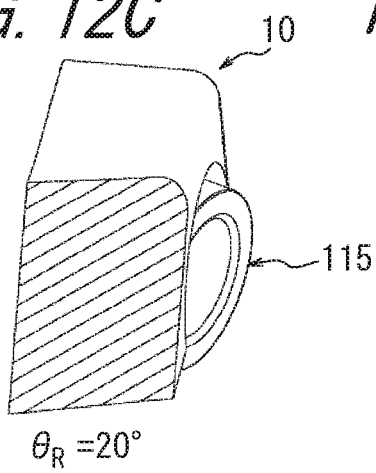
Figure 12D:
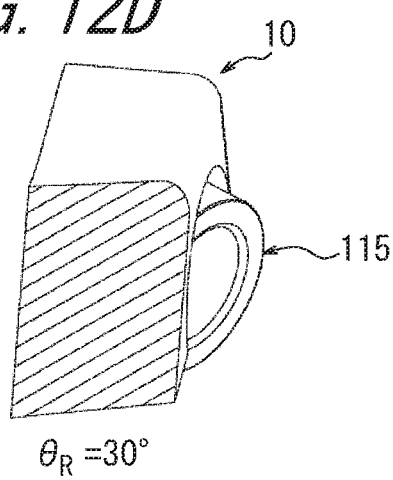
Figure 12E:
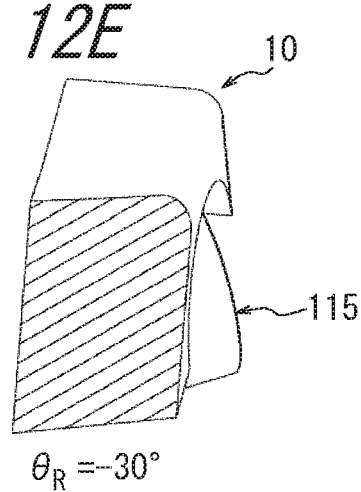
Figure 13A:
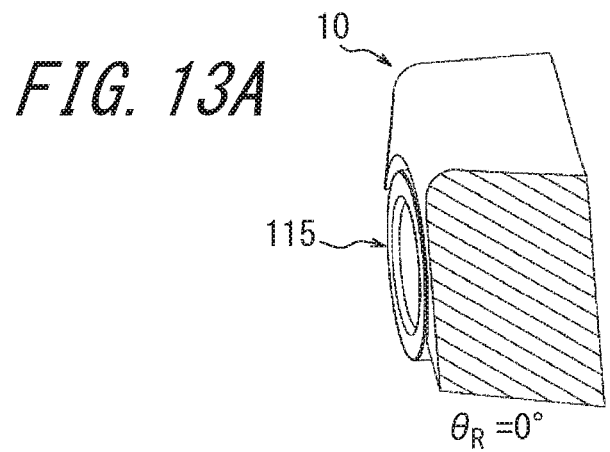
FIGS. 13A to 13C illustrate examples of images captured by a left side camera of FIGS. 10A to 10C.
Figure 13B:
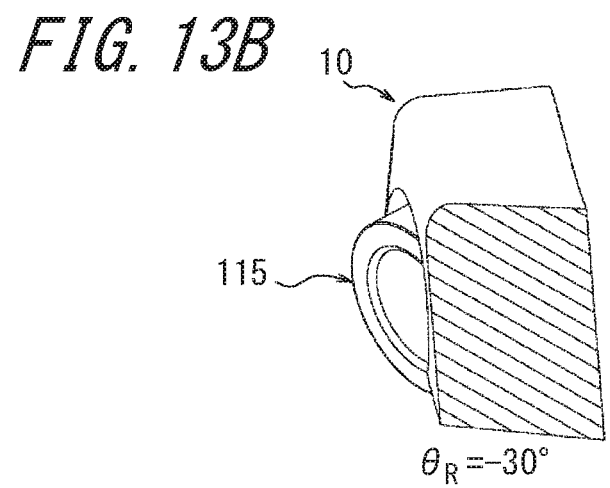
Figure 13C:
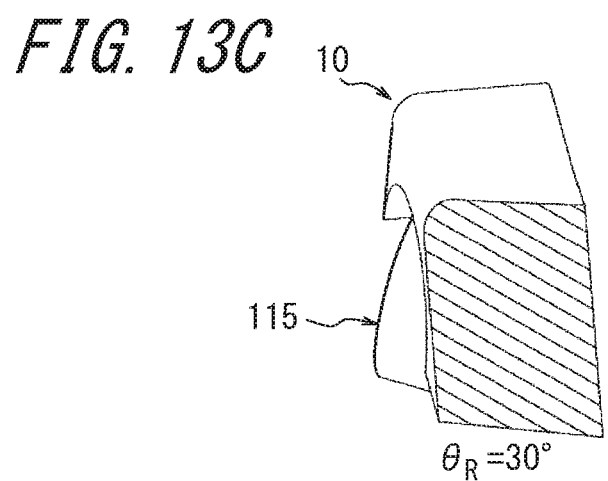
Figure 14A:
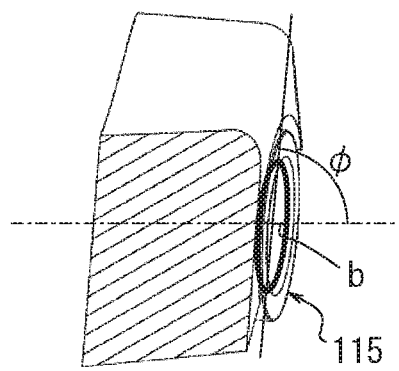
FIGS. 14A to 14D illustrate the examples of the images captured by the side camera as illustrated in FIGS. 12A to 12D and subjected to ellipse detection.
Figure 14B:
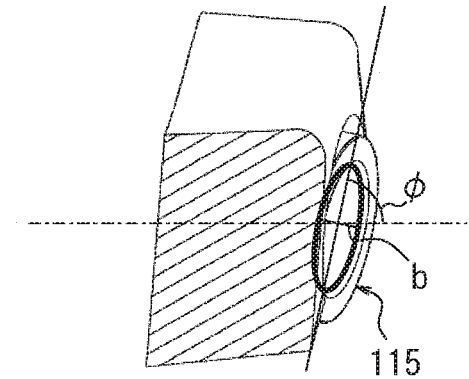
Figure 14C:
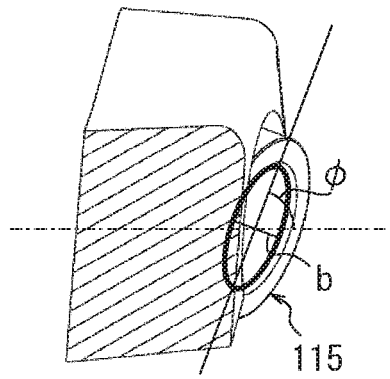
Figure 14D:
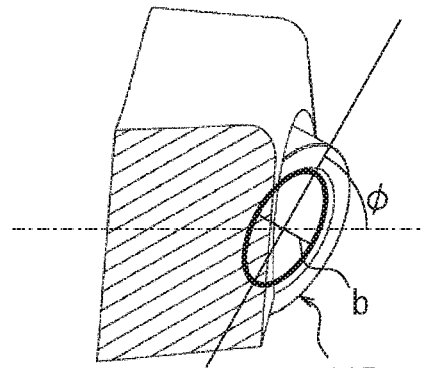

Similarly, the shape of the steered wheel 115 on each image generated by the left side camera 111 differs depending on the steering angle $\theta_R$ of the steered wheel. FIGS. 13A to 13C illustrate examples of images captured by the left side camera 111 at different steering angles $\theta_R$ of the steered wheel, and $\theta_R=0°$ in FIG. 13A, $\theta_R=-30°$ in FIG. 13B, and $\theta_R=30°$ in FIG. 13C. As the steering angle $\theta_R$ of the steered wheel decreases from 0°, a part of the side surface of the steered wheel 115 is concealed by the shadow of the mobile object 10, and accordingly, the steered wheel 115 has an elliptical shape that is partly missing (refer to FIG. 13B). On the other hand, as the steering angle $\theta_R$ of the steered wheel increases from 0° to a certain steering angle or more, the side surface of the steered wheel 115 does not appear on the image (refer to FIG. 13C). When the steered wheel's steering angle $\theta_R=0°$, the steered wheel 115 on the image generated by the left side camera 111 and the steered wheel 115 on the image generated by the right side camera 111 are symmetrical (FIGS. 12A and 13A).

Through the onboard network 100 such as CAN, the steering angle determination unit 119 (refer to FIG. 11) is configured to acquire the steering angle $\theta_m$ of the steered wheel detected by the steering angle sensor when an image is captured by the side camera imaging unit 118. A steering angle $\theta_m$ refers to a turning angle of the steering within the steerable range of the steering, with the steering angle neutral point defined as 0°. In the present embodiment, a steering angle $\theta_m$ detected by the steering angle sensor increases by rightward rotation of the steering. Generally, steering angles $\theta_m$ detected by the steering angle sensor are in one-to-one correspondence with steering angles $\theta_R$ of the steered wheel.

The side camera controller 120 is configured to control operation of components of the side camera 111. For example, the side camera controller 120 controls the side camera imaging unit 118 of the left side and the right side camera 111 to generate a pair of simultaneously captured images of the left and the right steered wheel 115 periodically, for example, at 30 fps. The side camera controller 120 also transmits and receives information through the onboard network 100.

The rear camera 112 includes an optical system 121, a rear camera imaging unit (the second imaging unit) 122, a rear camera storage 123, an image superimposing unit 124, and a rear camera controller 125.

Similarly to the optical system 117 of the side camera 111, the optical system 121 includes a plurality of lenses and forms an image of a subject.

Similarly to the side camera imaging unit 118, the rear camera imaging unit 122 is configured to capture (generate) an image of surroundings formed by the optical system 121.

The rear camera storage 123 stores therein the correction value $\theta_a$ acquired from the steering angle correction device 113. The correction value $\theta_a$ is described later in detail.

The image superimposing unit 124 is configured to acquire, via the onboard network 100, a steering angle $\theta_m$ detected by the steering angle sensor. Furthermore, with the steering angle $\theta_m$ detected by the steering angle sensor, the image superimposing unit 124 superimposes a drive assisting indicator over a predetermined position on an image of surroundings captured by the rear camera imaging unit 122. Preferably, the image superimposing unit 124 superimposes the drive assisting indicator by using the steering angle $\theta_m$ detected by the steering angle sensor and corrected by the correction value $\theta_a$ stored in the rear camera storage 123.

As illustrated in FIG. 6, examples of the drive assisting indicator 30 include a vehicle width extension line 31 and a distance reference line 32. The vehicle width extension line 31 defines a track over which each end of the mobile object 10 passes during a backward movement, and the shape and display position of the vehicle width extension line 31 differs depending on the steering angle. The distance reference line 32 represents a predetermined distance, such as a distance of 1 m or 3 m, from the current mobile object 10. The indicator 30 allows a driver to perceive a direction in which the mobile object 10 is expected to travel during the backward movement of the mobile object 10.

The rear camera controller 125 (refer to FIG. 11) is configured to control operation of components of the rear camera 112. For example, the rear camera controller 125 receives the correction value $\theta_a$ from the steering angle correction device 113 and stores the correction value $\theta_a$ in the rear camera storage 123 The rear camera controller 125 also transmits and receives information via the onboard network 100.

The steering angle correction device 113 is configured to calculate the correction value $\theta_a$ used to correct a steering angle $\theta_m$, which is detected by the steering angle sensor, to coincide with the actual steering angle $\theta_r$. Calculation of the correction value $\theta_a$ is described later in detail. The steering angle correction device 113 includes an acquisition unit 126, a correction device storage 127, an extraction unit 128, and an arithmetic unit 129.

Via, for example, the onboard network 100, the acquisition unit 126 is configured to acquire, from the left and the right side camera 111, a pair of simultaneously captured images of the left and the right steered wheel 115, in correspondence with the steering angle $\theta_m$ that the steering angle sensor detects when the images are captured.

The correction device storage 127 stores therein the degree of symmetry between the left and the right steered wheel 115 on a pair of images that as calculated by the arithmetic unit 129, in correspondence with the steering angle $\theta_m$ that the steering angle sensor detects when the images are captured. The degree of symmetry is described later in detail. Furthermore, the correction device storage 127 stores therein the correction value $\theta_m$ calculated by the arithmetic unit 129.

The extraction unit 128 is configured to extract the steered wheel 115 on each of the pair of images acquired by the acquisition unit 126. For example, the extraction unit 128 extracts the steered wheel 115 on the images by edge detection and ellipse detection (approximation). Edge detection uses, for example, the Canny filter to detect edge components on the images. Ellipse detection uses, for example, Hough transformation to calculate an elliptical shape approximated to the steered wheel 115 and parameters of the ellipse. The parameters of the ellipse refer to the central coordinate (x, y), the long side length a, and the short side length b of the ellipse and an inclination φ formed by the horizontal axis and the major axis of the ellipse on the image.

Preferably, the extraction unit 128 extracts the steered wheel 115 on the image in a predetermined area on the image that may include the steered wheel 115. The predetermined area on the image that may include the steered wheel 115 may be determined in advance in consideration of, for example, differences in mounting angle of the side cameras 111 or may be determined automatically by the extraction unit 128 according to any method.

Here, a description is given of ellipses detected by ellipse detection. FIGS. 14A to 14D illustrate examples of ellipses (in thick lines in FIGS. 14A to 14D) detected with respect to images that the right side camera 111 generates at different steering angles $\theta_R$ of the steered wheel, and $\theta_R$=0° in FIG. 14A, $\theta_R$=10° in FIG. 14B, $\theta_R$=20° in FIG. 14C, and $\theta_R$=30° in FIG. 14D. Additionally, FIGS. 14A to 14D illustrate the examples where ellipse detection is applied to a wheel portion of the steered wheel 115. However, ellipse detection may also be applied to, for example, a tire portion of the steered wheel 115. Although in the examples where $\theta_R$=10° or more the wheel portion of the steered wheel 115 has a partly missing elliptical shape (refer to FIGS. 12B to 12D), an ellipse conforming to the wheel portion of the steered wheel 115 is detected by ellipse detection (refer to FIGS. 14B to 14D).

The shape of the detected ellipse differs depending on the steering angle $\theta_R$ of the steered wheel when the image is captured. In detail, as the steering angle $\theta_R$ of the steered wheel increases from 0°, the inclination φ formed by the horizontal axis and the major axis of the detected ellipse on the image decreases, and the short side length b of the same increases. On the other hand, even when the steering angle $\theta_R$ of the steered wheel increases, changes in the remaining parameters, namely, the central coordinate (x, y) and the long side length a, of the ellipse are relatively small (refer to FIGS. 14B to 14D). Similarly, as for ellipses detected with respect to images that the left side camera 111 generates at different steering angles $\theta_R$ of the steered wheel, as the steering angle $\theta_R$ of the steered wheel decreases from 0°, the inclination φ formed by the horizontal axis and the major axis on each image decreases, and the short side length b on the same increases.

The arithmetic unit 129 (refer to FIG. 11) is configured to calculate the degree of symmetry between the left and the right steered wheel 115 on a pair of images. The degree of symmetry is an indicator of the degree of left-right symmetry of the left and the right steered wheel 115 on the pair of images. For example, the degree of symmetry in the present embodiment refers to the degree of correlation based on image matching. The arithmetic unit 129 is configured to perform image matching by laterally inverting one of the pair of images of ellipses detected by the extraction unit 128 and to calculate the degree of correlation obtained from image matching as the degree of symmetry. The arithmetic unit 129 also stores, in the correction device storage 127, data of the calculated degree of symmetry (correlation) and the steering angle $\theta_m$ that the steering angle sensor detects when the pair of images used for the calculation of the degree of symmetry is captured, in correspondence with each other.

Furthermore, based on a plurality of pieces of data stored in the correction device storage unit 127, the arithmetic unit 129 calculates a probability distribution of the degrees of symmetry (correlation) with respect to the steering angles $\theta_m$ detected by the steering angle sensor (refer to FIG. 5). The probability distribution may adopt any probability distribution model. The arithmetic unit 129 also calculates a steering angle $\theta_p$ at the peak position of the calculated probability distribution. Preferably, the arithmetic unit 129 calculates the steering angle $\theta_p$ at the peak position of the probability distribution when sufficient data to calculate the probability distribution is stored. For example, the arithmetic unit 129 may calculate the steering angle $\theta_p$ at the peak position of the probability distribution when the number of pieces of stored data is greater than or equal to the predetermined threshold $th_1$ and when the variance $\sigma^2$ of the calculated probability distribution is less than the predetermined threshold $th_2$.

Herein, the steering angle $\theta_p$ at the peak position of the probability distribution calculated by the arithmetic unit 129 is estimated to be the steering angle $\theta_m$ that the steering angle sensor detects when the actual steering angle $\theta_r$ equals is 0°. In cases where there is an error (hereinafter, called the detection error) between the steering angle $\theta_m$ detected by the steering angle sensor and the actual steering angle $\theta_r$, the steering angle $\theta_m$ that the steering angle sensor detects when the actual steering angle $\theta_r$ is 0° equals the detection error of the steering angle sensor. The arithmetic unit 129 determines the steering angle $\theta_p$ at the peak position of the probability distribution as the detection error $\Delta\theta$ of the steering angle sensor.

When the absolute value of the calculated detection error $\Delta\theta$ is greater than or equal to the predetermined threshold $th_3$, that is to say, when a large error is present between the steering angle $\theta_m$ detected by the steering angle sensor and the actual steering angle $\theta_r$, the arithmetic unit 129 stores, in the correction device storage 127, the detection error $\Delta\theta$ as a correction value $\theta_a$. Alternatively, when the correction value $\theta_a$ is already stored in the correction device storage 127 and when the absolute value of the value obtained by subtracting the correction value $\theta_a$ from the detection error $\Delta\theta$ is greater than or equal to the predetermined threshold $th_3$, the arithmetic unit 129 updates the correction value $\theta_a$ with the detection error $\Delta\theta$ and stores the new correction value $\theta_a$ in the correction device storage 127. Then, the arithmetic unit 129 transmits the correction value $\theta_a$ to other components through the onboard network 100.

Figure 15:
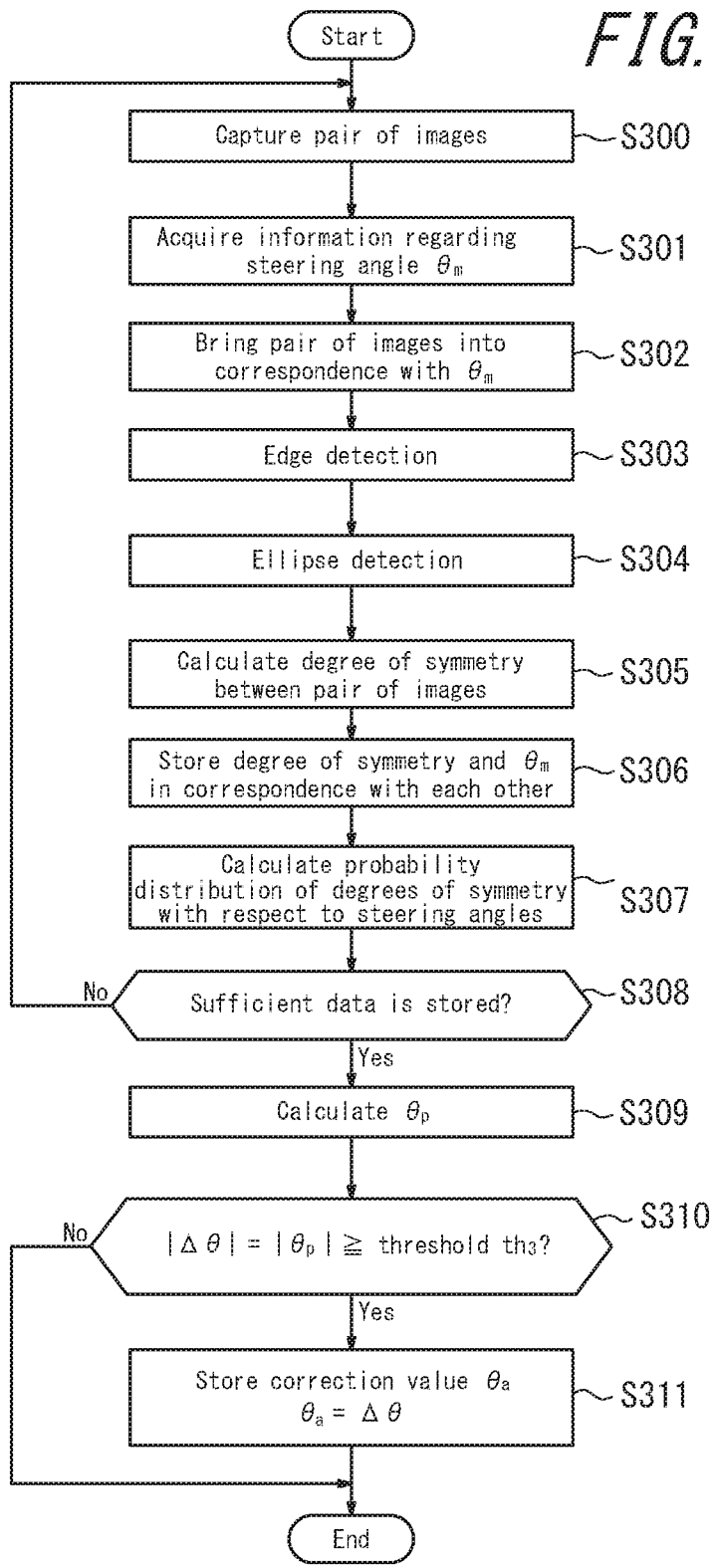
FIG. 15 is a flowchart illustrating operation of a steering angle correction system according to the third embodiment of the present disclosure.

The following describes processing, performed by the steering angle correction system B, of calculating the correction value according to the third embodiment with reference to a flowchart of FIG. 15. This processing is performed when, for example, the mobile object 10 starts to drive.

Firstly, the side camera imaging unit 118 of the left and the right side camera 111 generates a pair of simultaneously captured images of surroundings of the mobile object 10 each including the corresponding one of the left and the right steered wheel 115 (Step S300).

Subsequently, the steering angle determination unit 119 acquires, via the onboard network 100, the steering angle $\theta_m$ that the steering angle sensor detects simultaneously with capture of the pair of images generated in Step S300 (Step S301).

Subsequently, via, for example, the onboard network 100, the acquisition unit 126 of the steering angle correction device 113 acquires the pair of images generated in Step S300 and the steering angle $\theta_m$ detected by the steering angle sensor in Step S301, in correspondence with each other (Step S302).

Subsequently, the extraction unit 128 applies edge detection to the pair of images acquired in Step S302 (Step S303).

Subsequently, the extraction unit 128 applies ellipse detection to the pair of images to which edge detection is applied in Step S303 (Step S304).

Subsequently, the arithmetic unit 129 calculates the degree of symmetry between the left steered wheel 115 and the right steered wheel 115 on the pair of images acquired in Step S302 (Step S305). For example, the arithmetic unit 129 performs image matching by laterally inverting one of the pair of images to which ellipse detection is applied in Step S304 and to calculate the degree of correlation obtained from image matching as the degree of symmetry.

Subsequently, the arithmetic unit 129 stores, in the correction device storage 127, data of the degree of symmetry calculated in Step S305 and the steering angle $\theta_m$ detected by the steering angle sensor and acquired in Step S302, in correspondence with each other (Step S306).

Subsequently, based on a plurality of pieces of data stored in the correction device storage unit 127 in Step S306, the arithmetic unit 129 calculates the probability distribution of the degrees of coincidence (correlation) with respect to the steering angles $\theta_m$ detected by the steering angle sensor (Step S307).

Subsequently, the arithmetic unit 129 determines whether sufficient data to calculate the probability distribution is stored (Step S308). For example, the arithmetic unit 129 determines that sufficient data is stored when the number of pieces of data stored in the correction device storage 127 is greater than or equal to the predetermined threshold $th_1$ and when the variance $\sigma^2$ of the calculated probability distribution calculated in Step S307 is less than the predetermined threshold $th_2$. When it is determined that sufficient data is stored (Yes in Step S308), processing moves to Step S309. On the other hand, when it is not determined that sufficient data is stored (No in Step S308), processing returns to Step S300 again for storing data.

When determining that sufficient data is stored (Yes in Step S308), the arithmetic unit 129 calculates the steering angle $\theta_p$ at the peak position of the probability distribution calculated in Step S307 (Step S309).

Subsequently, the arithmetic unit 129 determines the steering angle $\theta_p$ at the peak position of the probability distribution calculated in Step S309, as the detection error $\Delta\theta$. Furthermore, the arithmetic unit 129 determines whether the absolute value of the detection error $\Delta\theta$ is greater than or equal to the predetermined threshold $th_3$ (Step S310). When it is determined that the absolute value of the detection error $\Delta\theta$ is greater than or equal to the predetermined threshold $th_3$ (Yes in Step S310), processing moves to Step S311. On the other hand, when it is determined that the detection error $\Delta\theta$ is less than the predetermined threshold $th_3$ (No in Step S310), processing ends.

When determining that the detection error $\Delta\theta$ is greater than or equal to the predetermined threshold $th_3$ (Yes in Step S310), the arithmetic unit 129 stores, in the correction device storage 127, the detection error $\Delta\theta$ as the correction value $\theta_a$ (Step S311).

In this way, according to the steering angle correction system of the third embodiment, the correction value $\theta_a$ is calculated based on the degree of symmetry between a pair of simultaneously captured images of the left and the right steered wheel 115. This allows automatic correction of a steering angle $\theta_m$ that the steering angle sensor detects during, for example, drive of the mobile object 10, thereby reducing complicatedness in handling of the operator. Furthermore, there is no need for information in an initial state, for example, before the detection error $\Delta\theta$ occurs in the steering angle sensor, and this allows correction regardless of when the steering angle correction system is mounted on the mobile object 10.

Furthermore, according to the steering angle correction system of the third embodiment, the correction value $\theta_a$ is calculated based on the probability distribution of the degrees of symmetry with respect to the steering angles $\theta_m$ detected by the steering angle sensor. This allows estimation with high precision of the steering angle $\theta_m$ that the steering angle sensor detects when the actual steering angle $\theta_t$ is 0°, thereby improving precision in calculation of the steering angle $\theta_m$. This also reduces the influence of errors in measurement of the steering angles $\theta_m$ detected by the steering angle sensor, thereby improving precision in calculation of the correction value $\theta_a$.

Moreover, according to the steering angle correction system of the third embodiment, when sufficient data to calculate the probability distribution of the degrees of symmetry with respect to the steering angles $\theta_m$ detected by the steering angle sensor is stored, the steering angle $\theta_p$ at the peak position of the probability distribution is calculated, and the correction value $\theta_a$ is calculated by using the steering angle $\theta_p$. This prevents calculation and update of the correction value $\theta_a$ when the peak fails to be detected correctly, such as when the number of pieces of data is insufficient or when the variance is too large, thereby improving reliability of the correction value $\theta_a$.

Moreover, according to the steering angle correction system of the third embodiment, when the absolute value of the error (detection error) $\Delta\theta$ between the steering angle $\theta_m$ detected by the steering angle sensor and the actual steering angle $\theta_t$ is greater than or equal to the threshold $th_3$, the detection error $\Delta\theta$ is stored as the correction value $\theta_a$. This prevents the correction value $\theta_a$ from calculated and updated because of a minor error caused by the influence of errors or the like in measurement of the steering angles $\theta_m$ detected by the steering angle sensor, thereby improving precision in calculation of the correction value $\theta_a$.

Moreover, according to the steering angle correction system of the third embodiment, edge detection is applied to each pair of images. This reduces the influence caused by changes in the environment, such as whether and outside brightness, to the measurement images during drive of the mobile object 10, thereby improving precision in calculation of the degree of correlation obtained by image matching.

Fourth Embodiment

Next, a description is given of the fourth embodiment of the present disclosure. The steering angle correction system B according to the fourth embodiment is similar to that according to the third embodiment, except for processing performed by the steering angle correction device 113.

Similarly to the third embodiment, the steering angle correction device 113 according to the fourth embodiment includes the acquisition unit 126, the correction device storage 127, the extraction unit 128, and the arithmetic unit 129. The acquisition unit 126 and the correction device storage 127 are similar to those in the third embodiment, and a description is omitted.

Similarly to the third embodiment, the extraction unit 128 is configured to extract the steered wheel 115 on a pair of images and to calculate the parameters of the ellipses. The extraction unit 128 according to the fourth embodiment calculates the parameters of the ellipses by extracting the steered wheel 115 on each image by laterally inverting one of the pair of images.

Similarly to the third embodiment, the arithmetic unit 129 is configured to calculate the degree of symmetry between the left and the right steered wheel 115 on the pair of images. At this time, the arithmetic unit 129 according to the fourth embodiment calculates the degree of symmetry with use of the parameters of the ellipses calculated by the extraction unit 128 by ellipse detection. In detail, the arithmetic unit 129 calculates a point α on a five-dimensional parameter space defined by the parameters of the ellipse of the steered wheel 115 detected from the one of the pair of images laterally inverted by the extraction unit 128. Similarly, the arithmetic unit 129 calculates a point β on the five-dimensional parameter space defined by the parameters of the ellipse of the steered wheel 115 detected from the other one of the pair of images. A distance d between the two points on the parameter space is calculated by the formula d=|α−β⊕. Herein, the higher the degree of correlation between the elliptical shape detected from each of the pair of images is, the smaller the value of the distance d becomes because the values of the parameters of each ellipse are similar. In contrast, the lower the degree of correlation between the two elliptical shapes is, the larger the value of the distance d becomes because the values of the parameters of each ellipse are different. The arithmetic 129 calculates, as the degree of symmetry, the distance d on the parameter space calculated by using the parameters of the ellipses. At this time, a smaller value of the distance d generally indicates a higher degree of symmetry.

Preferably, the arithmetic unit 129 calculates the degree of symmetry by using weighted values of parameters of ellipses. As mentioned earlier, the shape of each ellipse detected differs depending on the steering angle $\theta_R$ (refer to FIGS. 14A to 14D). Herein, the amounts of change in the inclination φ and the short side length b of the ellipse are greater, and the amounts of change in the remaining parameters, namely, the central coordinate and the long side length, of the ellipse are small, in response to a change in the steering angle $\theta_R$ of the steered wheel. That is to say, the inclination φ and the short side length b of the ellipse are more sensitive to a change in the steering angle $\theta_R$ of the steered wheel. For example, the points α and β on the parameter space may be determined by assigning greater weight to at least one of the inclination φ and the short side length b among the parameters of the ellipses than to the remaining parameters, namely, the central coordinate (x, y) and the long side length a, and the distance d between the two points may be calculated as the degree of symmetry.

Similarly to the third embodiment, the arithmetic unit 129 also calculates the probability distribution of the degrees of symmetry (distances d) and calculates the correction value $\theta_a$ based on the steering angle $\theta_p$ at the peak position of the calculated probability distribution. Since in the present embodiment the distance d on the parameter space calculated by using the parameters of the ellipses is used as the degree of symmetry, the peak of the probability distribution is directed downward (refer to FIG. 8).

In this way, according to the steering angle correction system of the fourth embodiment, the distance d, which is calculated based on the parameters of the ellipses detected by laterally inverting one of a pair of images, as the degree of symmetry between the left steered wheel 115 and the right steered wheel 115 on the pair of images. Accordingly, processing load is reduced compared with the third embodiment in which the degree of symmetry is calculated by image matching. Furthermore, by assigning greater weight to one or more parameters more sensitive to a change in the steering angle $\theta_R$ of the steered wheel among the plurality of parameters of each ellipse, precision in calculation of the degree of symmetry is improved, and precision in calculation of the correction value $\theta_a$ is improved.

Modification of Third and Fourth Embodiments

Next, a description is given of a steering angle correction system according to a modification of the third and the fourth embodiment of the present disclosure. The steering angle correction system B according to the present modification is similar to that according to the third embodiment, except for that that the probability distribution of the degrees of symmetry is not calculated and that the correction value $\theta_a$ is calculated when a pair of images is symmetrical.

Similarly to the third embodiment, the steering angle correction device 113 includes the acquisition unit 126, the correction device storage 127, the extraction unit 128, and the arithmetic unit 129. The acquisition unit 126 and the extraction unit 128 are similar to those in the third embodiment, and a description is omitted.

Furthermore, the correction device storage 127 stores therein the correction value $\theta_a$ calculated by the arithmetic unit 129.

Similarly to the third embodiment, the arithmetic unit 129 is configured to calculate the degree of symmetry between the left and the right steered wheel 115 on the pair of images. In the present modification, either one of the degree of correlation obtained by image matching and the distance d between the two points on the parameter space of the ellipses may be adopted as the degree of symmetry. The description below describes an example where the degree of correlation, obtained by image matching between one of the pair of images that is laterally inverted and the other one of the pair of images, is calculated and where the calculated degree of correlation is adopted as the degree of symmetry.

Based on the calculated degree of symmetry (correlation), the arithmetic unit 129 determines whether the shapes of the left and the right steered wheel 115 on the pair of images are symmetrical. It is determined that the shapes are symmetrical when, for example, the degree of correlation as the degree of symmetry is greater than or equal to the predetermined threshold $th_4$. When determining that the shapes of the steered wheel 115 are symmetrical, the arithmetic unit 129 determines the steering angle $\theta_m$ that the steering angle sensor detects when the pair of images used for the calculation of the degree of symmetry as the error (detection error) $\Delta\theta$ between the steering angle $\theta_m$ detected by the steering angle sensor and the actual steering angle $\theta_r$. Furthermore, similarly to the third embodiment, when the absolute value of the determined detection error $\Delta\theta$ is greater than or equal to the predetermined threshold $th_3$, the arithmetic unit 129 stores, in the correction device storage 127, the detection error $\Delta\theta$ as the correction value $\theta_a$.

The following describes processing, performed by the steering angle correction system B, of calculating the correction value according to the present modification with reference to a flowchart of FIG. 16.

Firstly, the side camera imaging unit 118 of the left and the right side camera 111 generates a pair of simultaneously captured images of surroundings of the mobile object 10 each including the corresponding one of the left and the right steered wheel 115 (Step S400).

Subsequently, the steering angle determination unit 119 acquires, via the onboard network 100, the steering angle $\theta_m$ that the steering angle sensor detects simultaneously with capture of the pair of images generated in Step S400 (Step S401).

Subsequently, via, for example, the onboard network 110, the acquisition unit 126 of the steering angle correction device 113 acquires the pair of images generated in Step S400 and the steering angle $\theta_m$ detected by the steering angle sensor in Step S401, in correspondence with each other (Step S402).

Subsequently, the extraction unit 128 applies edge detection to the pair of images acquired in Step S402 (Step S403).

Subsequently, the extraction unit 128 applies ellipse detection to the pair of images to which edge detection is applied in Step S403 (Step S404).

Subsequently, the arithmetic unit 129 calculates the degree of symmetry between the left steered wheel 115 and the right steered wheel 115 on the pair of images acquired in Step S402 (Step S405). For example, the arithmetic unit 129 performs image matching by laterally inverting one of the pair of images to which ellipse detection is applied in Step S404 and to calculate the degree of correlation obtained from image matching as the degree of symmetry.

Subsequently, the arithmetic unit 129 determines whether the shapes of the left steered wheel 115 and the right steered wheel 115 on the pair of images acquired in Step S402 are symmetrical (Step S406). The arithmetic unit 129 determines that the shapes are symmetrical when, for example, the degree of correlation as the degree of symmetry is greater than or equal to the predetermined threshold $th_4$. When it is determined that the shapes are symmetrical (Yes in Step S406), processing moves to Step S407. When it is not determined that the shapes are symmetrical (No in Step S406), processing returns to Step S400.

When determining that the shapes are symmetrical (Yes in Step S406), the arithmetic unit 129 determines the steering angle $\theta_m$ detected by the steering angle sensor and acquired in Step S402 as the detection error $\Delta\theta$ and determines whether the absolute value of the detection error $\Delta\theta$ is greater than or equal to the predetermined threshold $th_3$ (Step S407). When it is determined that the absolute value of the detection error $\Delta\theta$ is greater than or equal to the predetermined threshold $th_3$ (Yes in Step S407), processing moves to Step S408. On the other hand, when it is determined that the detection error Δθ is less than the predetermined threshold th₃ (No in Step S407), processing ends.

When determining that the detection error Δθ is greater than or equal to the predetermined threshold th₃ in Step S407 (Yes in Step S407), the arithmetic unit 129 stores, in the correction device storage 127, the detection error Δθ as the correction value $\theta_a$ (Step S408).

In this way, according to the steering angle correction system of the present modification, everytime a pair of images and the steering angle $\theta_m$ detected by the steering angle sensor are acquired in correspondence with each other, it is determined whether the shapes of the left steered wheel 115 and the right steered wheel 115 on both the images are symmetrical based on the calculated degree of symmetry. Then, when it is determined that the shapes are symmetrical, the correction value $\theta_a$ is calculated. Accordingly, unlike the third embodiment, there is no need for storing, in the correction device storage 127, data of the steering angles $\theta_m$ detected by the steering angle sensor and the degrees of symmetry in one-to-one correspondence, and the volume of stored data is reduced.

Although the present disclosure has been described based on the drawings and the embodiments, it is to be noted that a person skilled in the art may easily make various changes and modifications according to the present disclosure. Therefore, such changes and modifications are to be understood as included within the scope of the present disclosure.

For example, components of the steering angle correction system may be separated and rearranged. For example, the steering angle correction device 113 may be included in the imaging device. Furthermore, in one example, the steering angle correction system may further include a navigation device that assists a driver, and the navigation device may include the arithmetic unit 129 of the steering angle correction device 113 and the image superimposing unit 124 of the rear camera 112.

Moreover, although in the above embodiments the acquisition unit 126 of the steering angle correction device 113 acquires an image from the side camera 111 via the onboard network 100, an image may also be acquired through a dedicated line.

Furthermore, a configuration that determines whether an ellipse detected by the extraction unit 128 correctly extracts the steered wheel 115 may also be included. For example, whether the steered wheel 115 is extracted may be determined by using information regarding colors on the image prior to edge detection within the ellipse detected on the image. By thus improving precision in extraction of the steered wheel 115 on an image and improving precision in calculation of the degree of symmetry, precision in calculation of the correction value $\theta_a$ is improved.

Moreover, although in the above embodiments the steering angle correction device 113 stores the calculated correction value $\theta_a$ in the correction device storage 127, the correction value $\theta_a$ may be transmitted to the steering angle sensor, and an output value of the steering angle sensor may be corrected. In this case, the image superimposing unit 124 does not need to correct a steering angle acquired via the onboard network 100, and processing load is reduced.

Moreover, although in the above embodiments the image superimposing unit 114 superposes the indicator 30 on an image captured by the rear camera 112, the indicator 30 may also be superimposed on an image captured by a front camera configured to capture an image of surroundings in front of the mobile object 10.

Moreover, although in the above embodiments the degree of correlation obtained by image matching or a distance between two points on the parameter space based on parameters of ellipses is used as the degree of symmetry, any indicator, which indicates the degree of symmetry between the shapes of the left steered wheel 115 and the right steered wheel 115 on a pair of images, may be adopted.

REFERENCE SIGNS LIST 10 mobile object
11 side camera
12 rear camera
13 display
14 steered wheel
15 door mirror
16 optical system
17 side camera imaging unit
18 steering angle determination unit
19 side camera controller
20 steering angle correction device
21 acquisition unit
22 correction device storage
23 extraction unit
24 arithmetic unit
25 optical system
26 rear camera imaging unit
27 rear camera storage
28 image superimposing unit
29 rear camera controller
30 indicator
31 vehicle width extension line
32 distance reference line
100 onboard network
111 side camera
112 rear camera
113 steering angle correction device
114 display
115 steered wheel
116 side mirror
117 optical system
118 side camera imaging unit
119 steering angle determination unit
120 side camera controller
121 optical system
122 rear camera imaging unit
123 rear camera storage
124 image superimposing unit
125 rear camera controller
126 acquisition unit
127 correction device storage
128 extraction unit
129 arithmetic unit

The invention claimed is:

1. A steering angle correction method, comprising:
acquiring at least one measurement image of a steered wheel of a vehicle;
acquiring a steering angle of the vehicle;
extracting the steered wheel at least on the measurement image by ellipse detection;
bringing the measurement image into correspondence with the steering angle of the vehicle;
calculating an indicator based on the steered wheel on the measurement image, wherein in the calculating the indicator, a degree of coincidence, between the steered wheel on the measurement image and the steered wheel on a reference image of the steered wheel captured at a reference steering angle, is calculated as the indicator by using parameters of ellipses detected; and calculating a correction value used to correct the steering angle, based on the indicator.

2. The steering angle correction method of claim 1, wherein the measurement image is acquired in plurality, the plurality of measurement images being captured at different steering angles, and in the calculating the correction value, the correction value is calculated based on distribution of the degrees of coincidence with respect to the steering angles.

3. The steering angle correction method of claim 1, wherein in the calculating the indicator, the degree of coincidence is calculated by assigning greater weight to at least one of the parameters indicating at least one of a short side and an inclination than to the remaining parameters of each ellipse.

4. The steering angle correction method of claim 1, wherein in the calculating the indicator, a degree of correlation is calculated as the degree of coincidence, the degree of correlation being obtained by image matching based on the measurement image and the reference image.

5. The steering angle correction method of claim 1, wherein in the acquiring at least one measurement image, acquiring a pair of simultaneously captured measurement images of a left and a right steered wheel in correspondence with a steering angle of a vehicle at which the pair of measurement images is captured, and in the calculating the indicator, a degree of symmetry between the left and the right steered wheel on the pair of measurement images is calculated as the indicator.

6. The steering angle correction method of claim 5, wherein in the acquiring at least one measurement image, a plurality of pairs of measurement images is acquired in plurality, the plurality of pairs of measurement images being captured at different steering angles, and in the calculating the correction value, the correction value is calculated based on distribution of the degrees of symmetry with respect to the steering angles.

7. A steering angle correction method comprising:
acquiring at least one measurement image of a steered wheel of a vehicle, wherein in the acquiring at least one measurement image, acquiring a pair of simultaneously captured measurement images of a left and a right steered wheel in correspondence with a steering angle of a vehicle at which the pair of measurement images is captured;
extracting the left and the right steered wheel on the pair of measurement images by ellipse detection;
acquiring a steering angle of the vehicle;
bringing the measurement image into correspondence with the steering angle of the vehicle;
calculating an indicator based on the steered wheel on the measurement image, wherein in the calculating the indicator, a degree of symmetry, between the left and the right steered wheel on the pair of measurement images, is calculated as the indicator by using parameters of ellipses detected; and
calculating a correction value used to correct the steering angle, based on the indicator.

8. The steering angle correction method of claim 7, wherein in the calculating the indicator, the degree of symmetry is calculated by assigning greater weight to at least one of the parameters indicating at least one of a short side and an inclination than to the remaining parameters of each ellipse.

9. The steering angle correction method of claim 7, wherein in the calculating the indicator, a degree of correlation is used to calculate the degree of symmetry, the degree of correlation being obtained by image matching based on the pair of measurement images.

10. An imaging device, comprising a controller programmed to:
acquire at least one measurement image of a steered wheel of a vehicle;
acquire a steering angle of the vehicle;
extract the steered wheel at least on the measurement image by ellipse detection;
bring the measurement image into correspondence with the steering angle of the vehicle at which the measurement image is captured; and
calculate an indicator based on the steered wheel on the measurement image, wherein in the calculating the indicator, a degree of coincidence, between the steered wheel on the measurement image and the steered wheel on a reference image of the steered wheel captured at a reference steering angle, is calculated as the indicator by using parameters of ellipses detected; and
calculate a correction value based on the indicator, the correction value being used to correct the steering angle.

11. The imaging device of claim 10, wherein the controller is programmed to:
generate an image of surroundings of the vehicle; and
superimpose a predetermined image on the image of surroundings, based on the correction value.

12. The imaging device of claim 10, wherein the controller is programmed to:
acquire a pair of simultaneously captured measurement images of a left and a right steered wheel in correspondence with a steering angle of a vehicle at which the pair of measurement images is captured, and
calculate a degree of symmetry between the left and the right steered wheel on the pair of measurement images as the indicator.

13. The imaging device of claim 12, wherein:
the controller is programmed to:
generate an image of surroundings of the vehicle; and
superimpose a predetermined image on the image of surroundings, based on the correction value.

14. A steering angle correction system, comprising:
a controller programmed to:
generate at least one measurement image of a steered wheel of a vehicle,
acquire the measurement image of the steered wheel,
acquire a steering angle of the vehicle,
extract the steered wheel at least on the measurement image by ellipse detection,
bring the measurement image into correspondence with the steering angle of the vehicle at which the measurement image is captured,
calculate an indicator based on the steered wheel on the measurement image, wherein in the calculating the indicator, a degree of coincidence, between the steered wheel on the measurement image and the steered wheel on a reference image of the steered wheel captured at a reference steering angle, is calculated as the indicator by using parameters of ellipses detected,
calculate a correction value based on the indicator, the correction value being used to correct the steering angle,
generate an image of surroundings of the vehicle, and
superimpose a predetermined image on the image of surroundings, based on the correction value; and a display configured to display the image of surroundings having the predetermined image superimposed thereon.

15. The steering angle correction system of claim 14, wherein: the controller is programmed to:
   generate a pair of simultaneously captured measurement images of a left and a right steered wheel;
   acquire the pair of measurement images in correspondence with a steering angle of a vehicle at which the pair of measurement images is captured; and
   calculate a degree of symmetry between the left and the right steered wheel on the pair of measurement images as the indicator.

* * * * *